United States Patent
Gray

(10) Patent No.: US 8,469,087 B2
(45) Date of Patent: Jun. 25, 2013

(54) INTERFACE FOR DEPLOYING WIRELINE TOOLS WITH NON-ELECTRIC STRING

(75) Inventor: Kevin L. Gray, Friendswood, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 13/019,137

(22) Filed: Feb. 1, 2011

(65) Prior Publication Data
US 2011/0162835 A1    Jul. 7, 2011

Related U.S. Application Data

(62) Division of application No. 12/132,699, filed on Jun. 4, 2008, now Pat. No. 7,878,242.

(51) Int. Cl.
*E21B 33/12* (2006.01)
*E21B 23/06* (2006.01)

(52) U.S. Cl.
USPC ............. 166/101; 166/66; 166/105; 166/179; 166/250.17

(58) Field of Classification Search
USPC ............... 166/179, 66, 105, 250.01, 250.17, 166/118, 181, 101
See application file for complete search history.

(56) References Cited

U.S. PATENT DOCUMENTS

| | | | |
|---|---|---|---|
| 2,589,506 A * | 3/1952 | Morrisett | 166/123 |
| 2,737,242 A | 3/1956 | Baker | |
| 2,753,942 A | 7/1956 | Gardiner | |
| 3,004,427 A | 10/1961 | Berry | |
| 3,036,460 A | 5/1962 | White et al. | |
| 3,163,225 A | 12/1964 | Perkins | |
| 3,439,740 A | 4/1969 | Conover | |
| 3,601,196 A | 8/1971 | Childers et al. | |
| 3,762,218 A | 10/1973 | Davis | |
| 4,102,401 A | 7/1978 | Erbstoesser | |
| 4,105,071 A | 8/1978 | Nicolas et al. | |
| 4,351,186 A | 9/1982 | Moulin | |
| 4,424,860 A | 1/1984 | McGill | |
| 4,444,050 A | 4/1984 | Revett | |
| 4,476,923 A | 10/1984 | Walling | |
| 4,479,548 A | 10/1984 | Gilbert | |

(Continued)

FOREIGN PATENT DOCUMENTS

GB     2355033 A     4/2001

OTHER PUBLICATIONS

Canadian Office Action for Application No. 2,667,934 dated Jan. 31, 2011.

(Continued)

*Primary Examiner* — Kenneth L Thompson
(74) *Attorney, Agent, or Firm* — Patterson & Sheridan, L.L.P.

(57) ABSTRACT

Embodiments of the present invention generally relate to a method and/or apparatus for deploying wireline tools with a non-electric string. In one embodiment, a method of determining a free point of a tubular string stuck in a wellbore includes deploying a tool string in the stuck tubular with a non-electric string. The free point assembly includes a battery, a controller, and a free point tool. The method further includes activating the free point tool by the controller. The free point tool contacts an inner surface of the stuck tubular string. The method further includes applying a tensile force and/or torque to the stuck tubular string; and measuring a response of the tubular string with the free point tool.

19 Claims, 29 Drawing Sheets

U.S. PATENT DOCUMENTS

| | | | |
|---|---|---|---|
| 4,572,290 | A | 2/1986 | Clifton |
| 4,619,319 | A | 10/1986 | Ringgenberg |
| 4,635,717 | A | 1/1987 | Jageler |
| 4,648,471 | A | 3/1987 | Bordon |
| 4,883,123 | A | 11/1989 | Zunkel et al. |
| 5,018,574 | A | 5/1991 | Smith |
| 5,025,861 | A | 6/1991 | Huber et al. |
| 5,040,619 | A | 8/1991 | Jordan et al. |
| 5,095,983 | A | 3/1992 | Magnani |
| 5,224,545 | A | 7/1993 | George et al. |
| 5,337,821 | A | 8/1994 | Peterson |
| 5,404,946 | A | 4/1995 | Hess |
| 5,477,921 | A | 12/1995 | Tollefsen |
| 5,611,401 | A | 3/1997 | Myers, Jr. et al. |
| 5,669,448 | A | 9/1997 | Minthorn et al. |
| 5,704,426 | A | 1/1998 | Rytlewski et al. |
| 5,799,733 | A * | 9/1998 | Ringgenberg et al. ........ 166/264 |
| 5,921,285 | A | 7/1999 | Quigley et al. |
| 6,142,231 | A | 11/2000 | Myers, Jr. et al. |
| 6,236,620 | B1 | 5/2001 | Schultz et al. |
| 6,341,654 | B1 * | 1/2002 | Wilson et al. ................. 166/387 |
| 6,394,184 | B2 | 5/2002 | Tolman et al. |
| 6,736,210 | B2 | 5/2004 | Hosie et al. |
| 6,745,834 | B2 | 6/2004 | Davis et al. |
| 6,886,631 | B2 | 5/2005 | Wilson et al. |
| 6,945,330 | B2 | 9/2005 | Wilson et al. |
| 7,395,703 | B2 | 7/2008 | Niemeyer et al. |
| 7,591,314 | B2 | 9/2009 | Sonnier et al. |
| 7,878,242 | B2 | 2/2011 | Gray |
| 2003/0010135 | A1 | 1/2003 | Maxit et al. |
| 2003/0147360 | A1 | 8/2003 | Nero et al. |
| 2004/0003657 | A1 | 1/2004 | Manke et al. |
| 2004/0177952 | A1 | 9/2004 | Turley et al. |
| 2004/0251027 | A1 | 12/2004 | Sonnier et al. |
| 2005/0150661 | A1 | 7/2005 | Kenison et al. |
| 2005/0211429 | A1 | 9/2005 | Gray et al. |
| 2005/0240351 | A1 | 10/2005 | Gray |
| 2005/0269106 | A1 | 12/2005 | Wilson et al. |
| 2006/0090905 | A1 | 5/2006 | Brennan et al. |
| 2006/0102342 | A1 | 5/2006 | East et al. |
| 2006/0231258 | A1 | 10/2006 | Head et al. |
| 2007/0044960 | A1 | 3/2007 | Lovell et al. |
| 2008/0128133 | A1 | 6/2008 | Turley et al. |
| 2008/0190605 | A1 | 8/2008 | Clapp et al. |

OTHER PUBLICATIONS

GB Search Report for Application No. GB0909524.1 dated Sep. 2, 2009.
Canadian Office Action for Application No. 2,667,934 dated Aug. 4, 2010.
Weatherford—Compact Memory Logging (CML), Weatherford International Ltd., 2006-2007, 2 pages.
UK Combined Search and Examination Report dated Feb. 13, 2012, Application No. GB1200612.8.
United Kingdom Combined Search and Examination Report dated Jun. 26, 2012, UK Application No. GB1210366.9.
Canadian Office Action dated Aug. 2, 2012, Canadian Application No. 2,776,415.
UK Examination Report dated Oct. 11, 2012 in GB Application No. 1210366.9.
Canadian Office Action dated Nov. 6, 2012, Canadian Application No. 2,776,415.

* cited by examiner

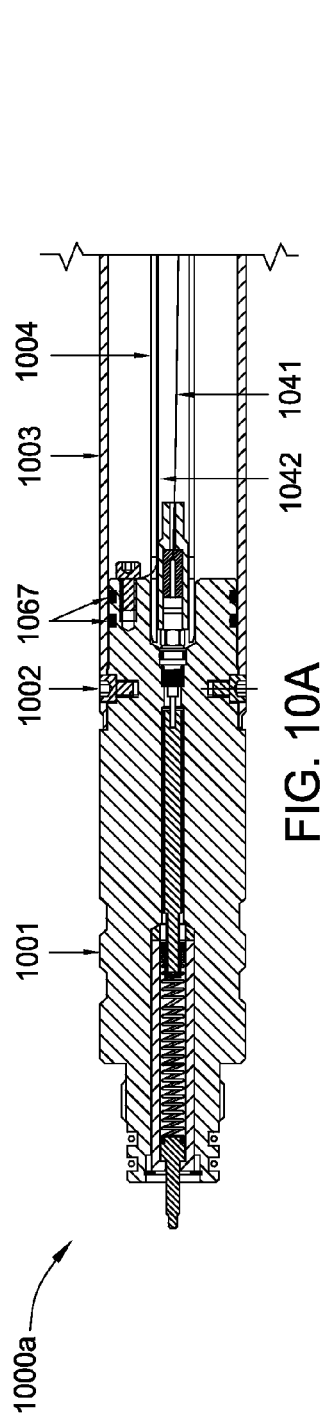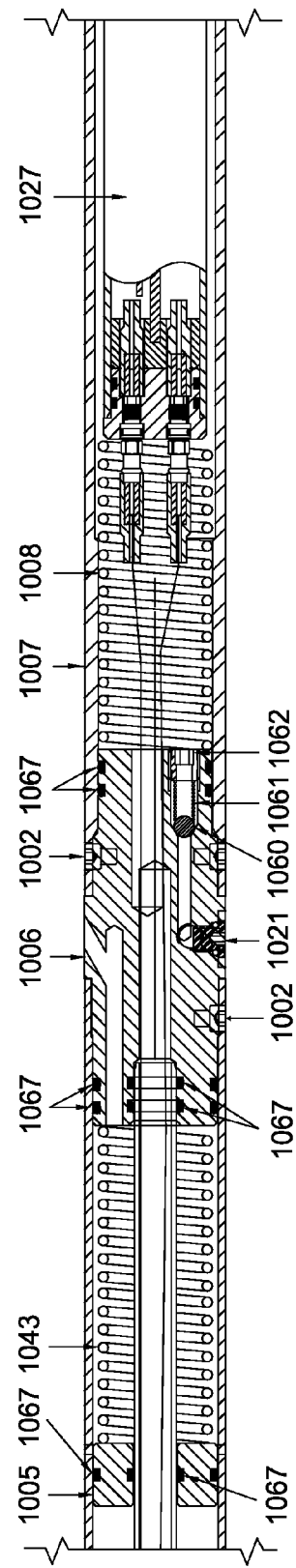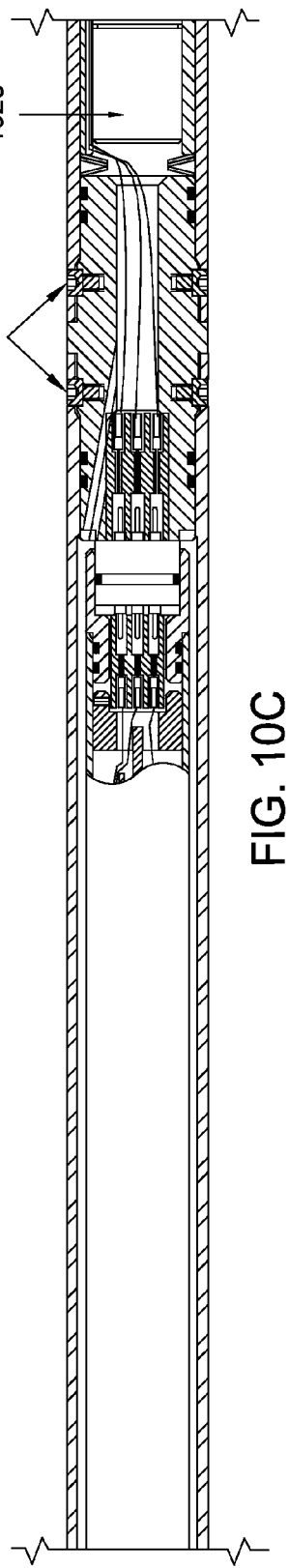

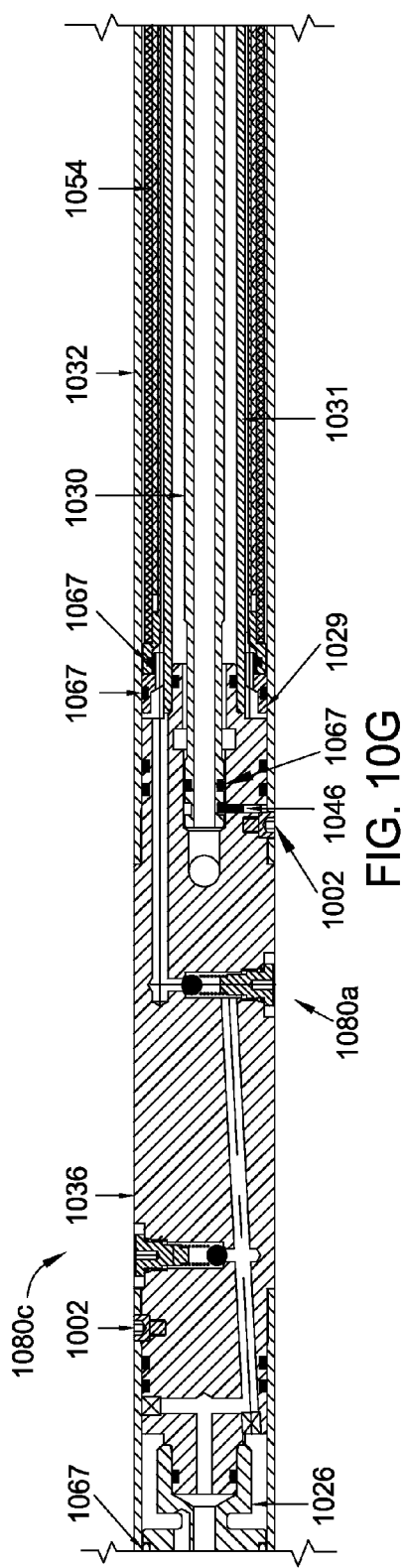
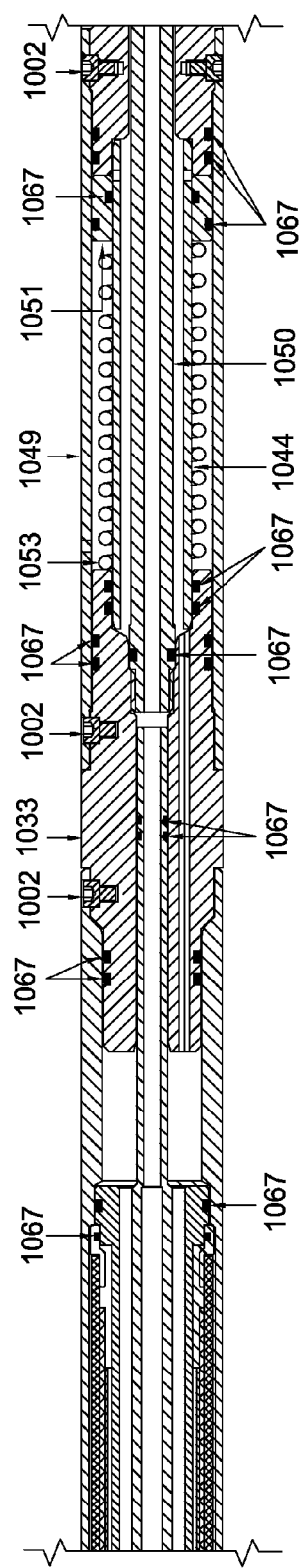
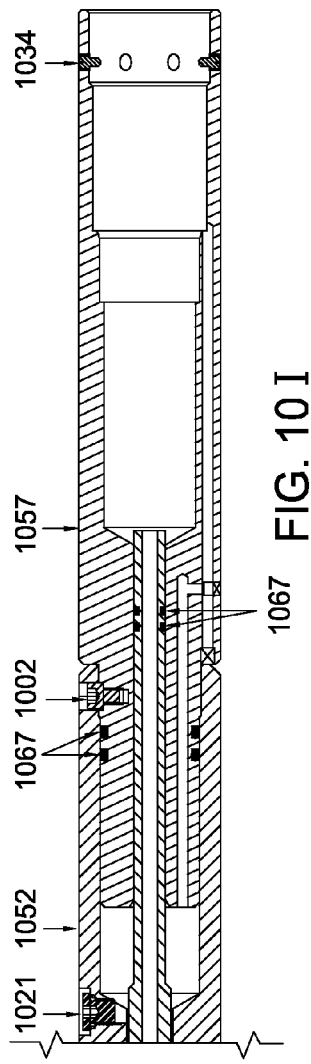
FIG. 10G
FIG. 10H
FIG. 10I

| | |
|---|---|
| 1350 | COMMUNICATIONS + |
| 1355 | COMMUNICATIONS - |
| 1360 | CONTROLLER POWER |
| 1365 | GROUND |
| 1370 | LT POWER |
| 1375a | NOT USED |
| 1375b | WIRELINE TOOL POWER |
| 1380a | NOT USED |
| 1380b | USB POWER |
| 1380c | BATTERY + |
| 1385a | NOT USED |
| 1385b | USB DATA + |
| 1385c | BATTERY + |
| 1390a | NOT USED |
| 1390b | USB DATA - |
| 1390c | BATTERY GROUND |
| 1395a | NOT USED |
| 1395b | USB GROUND |
| 1395c | BATTERY GROUND |

FIG. 13B

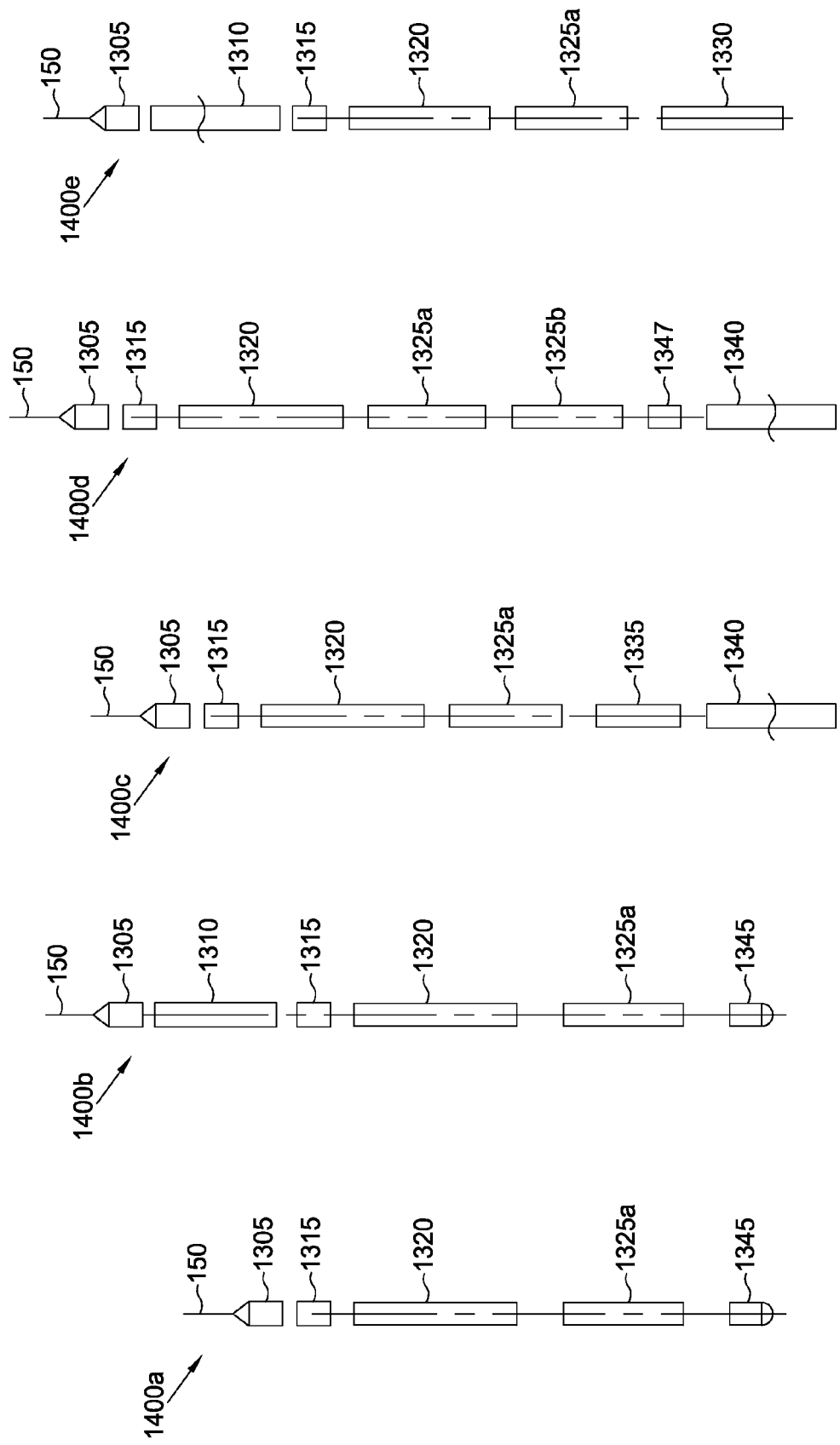

INTERFACE FOR DEPLOYING WIRELINE TOOLS WITH NON-ELECTRIC STRING

CROSS REFERENCE TO RELATED APPLICATIONS

Field of the Invention

This application is a divisional of U.S. patent application Ser. No. 12/132,699, filed Jun. 4, 2008, now U.S. Pat. No. 7,878,242, which is herein incorporated by reference in its entirety.

BACKGROUND OF THE INVENTION

1. Field of the Invention

Embodiments of the present invention generally relate to a method and/or apparatus for deploying wireline tools with a non-electric string.

2. Description of the Related Art

Wellbores are typically formed by drilling a hole into the earth through use of a drill bit disposed at the end of a drill string. Most commonly, the drill string is a series of threaded tubular members, such as steel pipe. Weight is applied to the drill string while the drill bit is rotated. Fluids are then circulated through a bore within the drill string, through the drill bit, and then back up the annulus formed between the drill string and the surrounding wellbore. The circulation of fluid in this manner serves to clear the bottom of the hole of cuttings, serves to cool the bit, and also serves to circulate the cuttings back up to the surface for retrieval and inspection.

With today's wells, it is not unusual for a wellbore to be completed in excess of ten thousand feet. The upper portion of the wellbore is lined with a string of surface casing, while intermediate portions of the wellbore may be lined with liner strings. The lowest portion of the wellbore remains open to the surrounding earth during drilling. As the wellbore is drilled to new depths, the drill string becomes increasingly longer. Because the wells are often non-vertical or deviated, a somewhat tortured path can be formed leading to the bottom of the wellbore where new drilling takes place. Because of the non-linear path through the wellbore, the drill string can become bound or other wise stuck in the wellbore as it moves axially or rotationally. In addition, the process of circulating fluids up the annulus within the earth formation can cause subterranean rock to cave into the bore and encase the drill string. All drilling operations must be stopped and valuable rig time lost while the drill string is retrieved (a.k.a. fished).

Because of the length of the drill string and the difficulty in releasing stuck portions, it is useful to know the point at which one tubular is stuck within another tubular or within a wellbore. The point above the stuck point is known as the "free point." It is possible to estimate the free point from the surface. This is based upon the principle that the length of the tubular will increase linearly when a tensile force within a given range is applied. The total length of tubular in the wellbore is known to the operator. In addition, various mechanical properties of the tubulars, such as yield strength and thickness, are also known. The operator can then calculate a theoretical extent of tubular elongation when a certain amount of tensile force is applied. The theoretical length is based on the assumption that the applied force is acting on the entire length of the tubular.

The known tensile force is next applied to the tubular. The actual length of elongation of the tubular is then measured at the surface of the well. The actual length of elongation is compared with the total theoretical length of elongation. By comparing the measured elongation to the theoretical elongation, the operator can estimate the sticking point of the tubular. For example, if the measured elongation is fifty percent of the theoretical elongation, then it is estimated that the tubular is stuck at a point that is approximately one half of the length of the tubular from the surface. Such knowledge makes it possible to locate tools or other items above, adjacent, or below the point at which the tubular is expected to be stuck.

It is desirable for the operator to obtain a more precise determination of the stuck point for a string of tubulars. To do this, the operator may employ a tool known as a "free point tool". The prior art includes a variety of free point tools and methods for ascertaining the point at which a tubular is stuck. One common technique involves the use of a free point tool that has either one or two anchors for attaching to the inner wall of the drill pipe. The tool is lowered down the bore of the drill string with a run-in string, and attached at a point to one of the tubulars. The tool utilizes a pair of relatively movable sensor members to determine if relative movement occurred. The tool is located within the tubular at a point where the stuck point is estimated. The tool is then anchored to the tubular at each end of the free point tool, and a known tensile force (or torsional force) is applied within the string. Typically, the force is applied from the surface.

If the portion of the tubular between the anchored ends of the free point tool is elongated when a tensile force is applied (or twisted when a torsional force is applied), it is known that at least a portion of the free point tool is above the sticking point. If the free point tool does not record any elongation when a tensile force is applied (or twisting when a torsional force is applied), it is known that the free point tool is completely below the sticking point. The free point tool may be incrementally relocated within the drill string, and the one or more anchor members reattached to the drill string. By anchoring the free point tool within the stuck tubular and measuring the response in different locations to a force applied at the surface, the location of the sticking point may be accurately determined.

Typically, the run-in string is wireline. Wireline is a cable having electrically conductive wires through which voltage may be supplied to power and control the tool. The wireline includes one or more conductive wires surrounded by an insulative jacket. The conductive wires supply a voltage signal to the tool from a voltage source at the surface. Typically, an operator at the surface controls the tool by varying the voltage signal supplied to the tool. For example, the operator may apply and remove the voltage signal to cycle power on and off, adjust a level of the voltage signal, or reverse a polarity of the voltage. The tool is designed to respond to these voltage changes in a predetermined manner.

A less expensive, non-electric support cable is commonly referred to as slickline. Because slickline has no conductive lines to supply power to the attached tool, the types of the tools deployed on slickline are typically non-electric tools, such as placement and retrieval tools, mandrels, etc. Recently, battery powered tools have recently been developed for slickline operation. Operation of the battery powered tools may be initiated by lowering a slip ring device down the slickline that comes in contact with a switching device on a top surface of the tools. Alternatively, operation of the tools may be initiated by a triggering device that generates a trigger signal, for example, based upon wellbore pressure (BHP), wellbore temperature (BHT), and tool movement. Regardless of the method of initiation, the absence of electrically conductive wires prevents conventional surface intervention used to control wireline tools, which typically limits tools deployed on slickline to simple tools requiring little or no control, such as logging tools.

Accordingly, a need therefore exists for a free point tool that can be quickly run into a wellbore on a more economical basis.

SUMMARY OF THE INVENTION

Embodiments of the present invention generally relate to a method and/or apparatus for deploying wireline tools with a non-electric string. In one embodiment, a method of determining a free point of a tubular string stuck in a wellbore includes deploying a tool string in the stuck tubular with a non-electric string. The free point assembly includes a battery, a controller, and a free point tool. The method further includes activating the free point tool by the controller. The free point tool contacts an inner surface of the stuck tubular string. The method further includes applying a tensile force and/or torque to the stuck tubular string; and measuring a response of the tubular string with the free point tool.

In another embodiment, a tool string for determining a free point of a tubular stuck in a wellbore, includes a longitudinal strain gage and/or a torsional strain gage; first and second anchors operable to longitudinally and rotationally couple the strain gages to the stuck tubular in an extended position; an electric motor operable to extend and/or retract the anchors; a battery; and a controller operable to supply electricity from the battery to the motor. The tool string is tubular.

In another embodiment, a method of flow testing multiple zones in a wellbore includes lowering a tool string into the wellbore with a non-electric run-in string. The tool string includes a battery, a controller, an inflatable packer or plug, and an electric pump. The method further includes operating the pump by the controller, thereby inflating the packer or plug and isolating a first zone from one or more other zones; monitoring flow from the first zone; deflating the packer or plug; moving the tool string in the wellbore; operating the pump by the controller, thereby inflating the packer or plug and isolating a second zone from one or more other zones; and monitoring flow from the second zone, wherein the zones are monitored in one trip.

In another embodiment, tool string for use in a wellbore includes an inflatable packer or plug; an electric pump operable to inflate the packer or plug; and a deflation tool operable to deflate the packer or plug in an open position. The deflation tool is repeatably operable between the open position and a closed position and the tool string is tubular. The tool string further includes a battery; and a controller operable to supply electricity from the battery to the pump.

In another embodiment, method for setting a plug in a cased or lined wellbore, comprising acts of: deploying a tool string in the wellbore using a non-electric string. The tool string includes a battery; a controller; a setting tool coupled to the run-in string; an adapter sleeve, and a packer or plug comprising a packing element. The method further includes actuating the setting tool by the controller. The setting tool exerts a force on the adapter sleeve which transfers the force to the packer or plug, thereby expanding the packing element into engagement with an inner surface of the casing or liner. The method further includes separating the setting tool from the packer or plug. The adapter sleeve remains with the packer or plug.

In another embodiment, a tool string for use in a formation treatment operation includes a setting tool comprising a mandrel and a setting sleeve. The setting sleeve is longitudinally moveable relative to the setting tool mandrel between a first position and a second position. The tool string further includes an adapter kit including an adapter rod and an adapter sleeve. The adapter rod is longitudinally coupled to the setting mandrel and releasably coupled to a plug mandrel. The adapter sleeve is configured so that when the setting sleeve is moved toward the second position the setting sleeve abuts the adapter sleeve. The tool string further includes a packer or plug including the plug mandrel and a packing element. The packing element is disposed along an outer surface of the mandrel. The adapter sleeve is configured to transfer a setting force to the plug, thereby radially expanding the packing element. The tool string is tubular.

In another embodiment, a tool string for use in wellbore includes a wireline tool; a battery module; a controller module operable to supply electricity from the battery to the wireline tool; a bus extending through the modules and operable to provide data and power communication among the modules; and a safety module operable to isolate the controller module from the wireline tool until the safety module detects a condition indicative of the tool string being disposed in the wellbore. The tool string is tubular.

In another embodiment, a tool string for use in tubular string stuck in a wellbore includes a cutting tool operable to sever the tubular string; an anchor operable to longitudinally and rotationally couple the cutting tool to the tubular string; a battery; and a controller operable to supply electricity from the battery to the cutting tool. The tool string is tubular.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 10A-10K illustrate an inflation tool suitable for use with the tool string.

FIGS. 13A and 13B illustrate an interface, according to another embodiment of the present invention.

FIGS. 14A-E illustrate configurations 1400a-e of the interface intended for specific operations.

DETAILED DESCRIPTION

Figure 1:
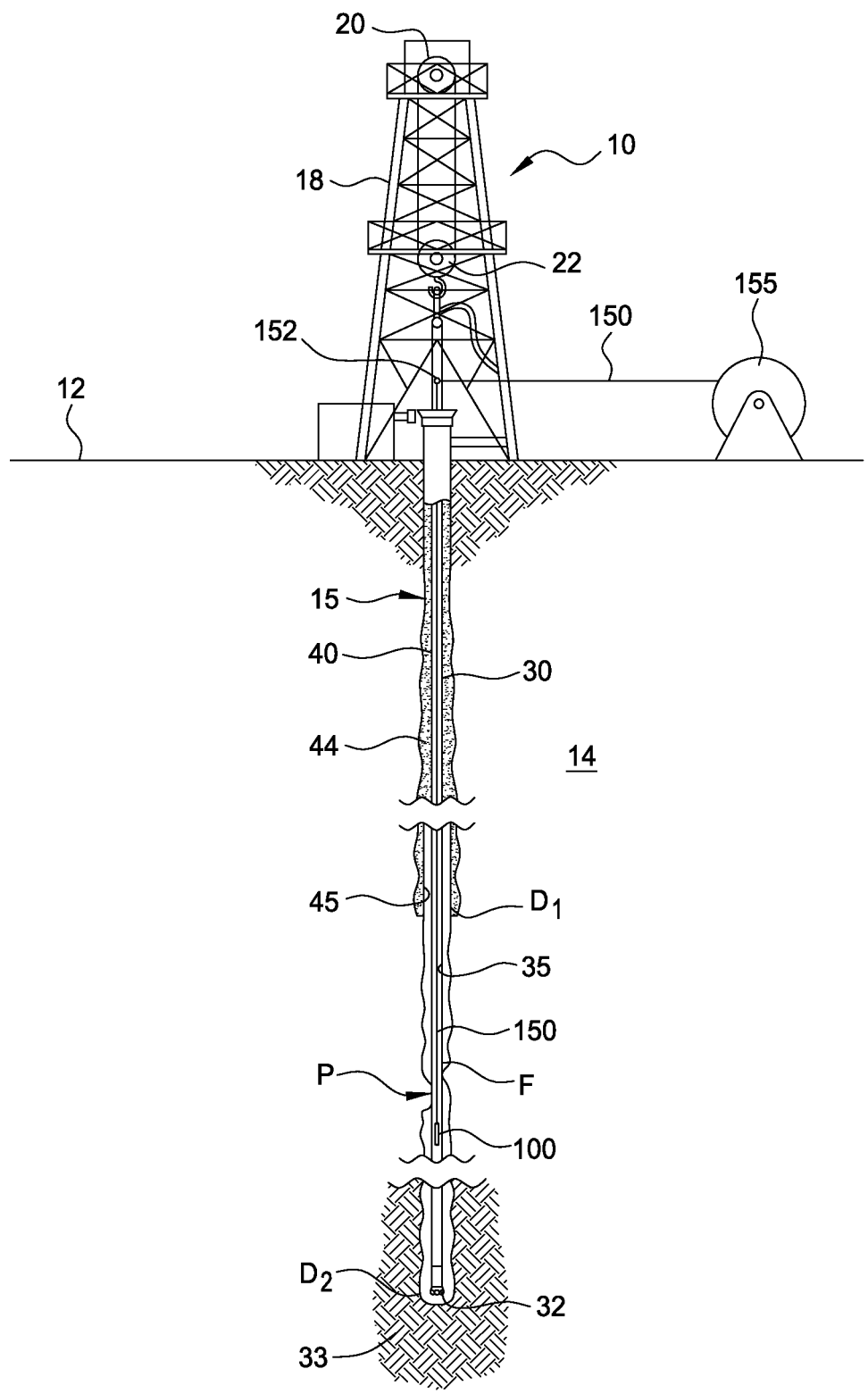
FIG. 1 shows a cross-sectional view of a wellbore being drilled.

FIG. 1 shows a cross-sectional view of a wellbore 15 being drilled. A drilling rig 10 is disposed over an earth surface 12 to create the wellbore 15 into subterranean formations 14. While a land-based rig 10 is shown, the drilling rig 10 may alternatively be a floating or submersible vessel located over a subsea wellbore. The drilling rig 10 includes draw works having a crown block 20 mounted in an upper end of a derrick 18. The draw works also include a traveling block 22. The traveling block 22 is selectively connected to the upper end of a drill string 30. The drill string 30 includes a plurality of joints or sections of tubulars, such as drill pipe, which are threaded end to end. Additional joints of pipe are attached to the drill string 30 as the wellbore 15 is drilled to greater depths.

The drill string 30 includes an inner bore 35 that receives circulated drilling fluid during drilling operations. The drill string 30 has a drill bit 32 attached to the lower end. Weight is placed on the drill bit 32 through the drill string 30 so that the drill bit 32 may act against lower rock formations 33. At the same time, the drill string 30 is rotated within the borehole 15. During the drilling process, drilling fluid, e.g., "mud," is pumped into the bore 35 of the drill string 30. The mud flows through apertures in the drill bit 32 where it serves to cool and lubricate the drill bit, and carry formation cuttings produced during the drilling operation. The mud travels back up an annulus 45 around the drill string 30, and carries the suspended cuttings back to the surface 12.

The wellbore 15 has been drilled to a first depth $D_1$, and then to a second depth $D_2$. At the first depth $D_1$, a string of casing 40 has been placed in the wellbore 15. The casing 40 serves to maintain the integrity of the formed wellbore 15, and isolates the wellbore 15 from any ground water or other fluids that may be in the formations 14 surrounding an upper portion of the wellbore 15. The casing 40 extends to the surface 12, and is fixed in place by a column of set cement 44. Below the first depth $D_1$, no casing or liner has yet been set.

A cave-in of the walls of the wellbore 15 has occurred at a depth P. The cave-in P has produced a circumstance where the drill string 30 can no longer be rotated or longitudinally translated within the wellbore 15, and is otherwise stuck. As discussed above, it is desirable for the operator to be able to locate the depth of point P. To this end, a free point tool string (FPT) 100 is run into the wellbore 15. The FPT 100 is run into the wellbore 15 on a non-electric run-in string 150. The run-in string 150 may be a slickline (shown), a coiled tubing string, or a continuous sucker rod (COROD) string. The FPT 100 and slickline 150 are lowered into the wellbore by unspooling the line from a spool 155. The spool 155 is brought to the drilling location by a service truck (not shown). Unspooling of the line 150 into the wellbore 15 is aided by sheave wheels 152. At the same time, the traveling block 22 is used to suspend the drill string 30. A rough estimate of the cave-in depth P may be determined by applying torque and/or a tensile load and measuring the resulting torsional deflection and/or elongation of the drill string 30.

The FPT 100 operates to more accurately locate the cave-in P along the length of the drill string 30 so that all of the free sections of drill pipe 30 above the stuck point P can be removed. Once all of the joints of pipe above an assured free point F are removed, new equipment can be run into the bore 15 on a working string to unstick or free the remaining drill string. From there, drilling operations can be resumed.

Figure 2:
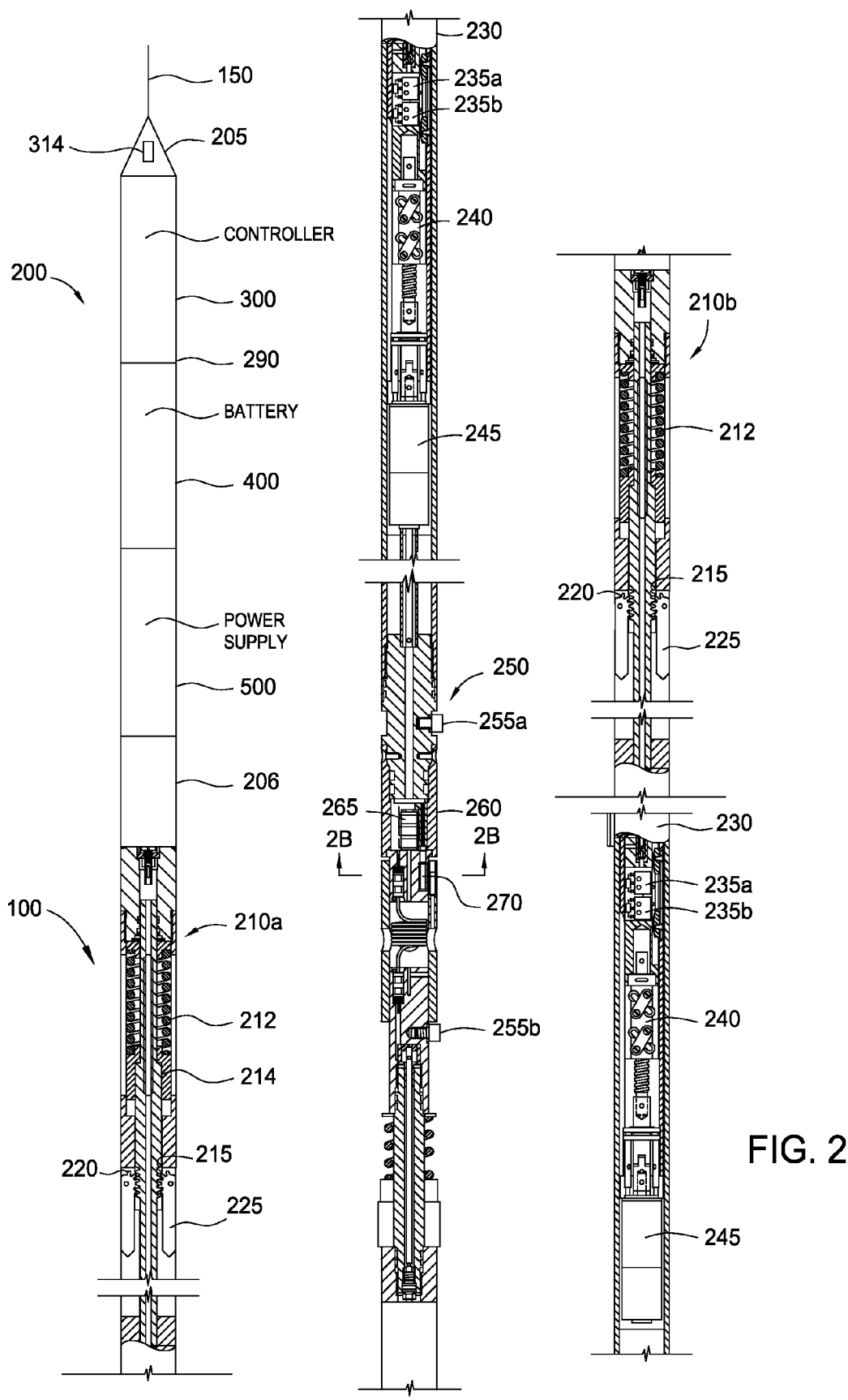
FIG. 2 illustrates a freepoint tool (FPT) deployed using an interface, according to one embodiment of the present invention.

FIG. 2 illustrates the FPT 100 deployed using an interface 200, according to one embodiment of the present invention. The FPT 100 is typically deployed using wireline. The interface 200 allows wireline operated tools, such as the FPT 100, to be deployed using non-electric run-in strings by providing power to and control over the tools that would have otherwise been provided from the surface using the wireline. Although shown with the FPT 100, the interface 200 may be used with any wireline deployed tool.

The FPT 100 includes upper 210a and lower 210b anchor assemblies and a sensor assembly 250. Each of the anchor assemblies 210a,b is operable to longitudinally and rotationally couple the FPT 100 to the stuck drill string 30, while the sensor assembly 250 measures the response of the drill string 30 to a tensile load and/or torque applied to the drill string 30 from the surface 12. Each of the anchor assemblies 210a,b may include a tubular housing 230, a tubular mandrel 214, two or more arms 225, a biasing member 212, and an actuator 245. The mandrel 214 is disposed within the housing 230 so that the mandrel may move longitudinally relative to the housing. Each of the arms 225 is pivoted to the housing 230 and operably coupled to the mandrel 214 so that longitudinal movement of the mandrel rotates the arms about the pivot between an extended position and a retracted position. In the extended position, the arms 225 engage an inner surface of the drill string 30, thereby longitudinally and rotationally coupling the housing to the drill string. The arms 225 may each include a tip made from a hard material, such as tungsten carbide, to penetrate the inner surface of the drill string 30. Teeth 215, 220 may be formed in an outer surface of the mandrel and an inner surface of each of the arms to provide a rack and pinion engagement between the mandrel and the arms. The biasing member, such as a spring 212, is disposed between a shoulder of the housing 230 and a shoulder of the mandrel 214 so that the arms are biased toward the extended position.

The mandrel 214 is operably coupled to the actuator, such as an electric motor 245. Operation of the motor 245 longitudinally moves the mandrel, thereby rotating the arms 225 between the extended position and the retracted position. The electric motor 245 may be operably coupled to the mandrel by a mechanical assembly 240, such as a ballscrew or a worm gear, which translates rotation from a shaft of the motor into longitudinal motion of the mandrel. One or more limit switches 235a, b may be provided to shut-off the motor 245 when the arms 225 reach the retracted position, thereby preventing damage to the motor. The arms 225 are configured to engage the drill string in the extended position at an angle, such as forty-five to sixty degrees, relative to a horizontal axis so that the tips of the arms are driven into the inner surface of the drill string upon application of a tensile load to the drill string and, in the event of failure of the motor, the FPT 100 may be retrieved to the surface even though the arms are in the extended position. The spring facilitates removal of the FPT 100 when the motor has failed by allowing the arms to collapse inwardly should an obstruction be encountered while retrieving the FPT. Alternatively, the arms may be actuated into the retracted position by a shearable connection (not shown) which may be activated from the surface by applying a tensile force to the slickline 150.

The sensor assembly 250 may include a longitudinal strain gage 265, such as a linear voltage differential transformer (LVDT), for measuring longitudinal deflection of the drill string 30 under a tensile load applied from the surface and/or a torsional strain gage, such as an angular deflection sensor (ADS) 270, for measuring torsional deflection of the drill string under torque applied from the surface. The LVDT 265 and ADS 270 are isolated from wellbore conditions by a housing 260. The housing 260 may be made from a metal or alloy, such as a high yield strength specialty alloy.

Figure 2A:
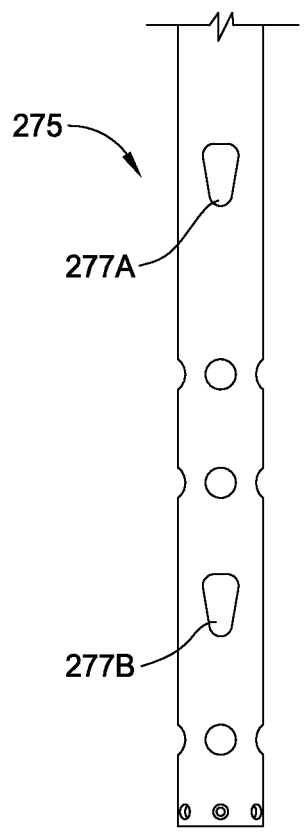
FIG. 2A is a side view of a carrier sleeve.
Figure 2B:
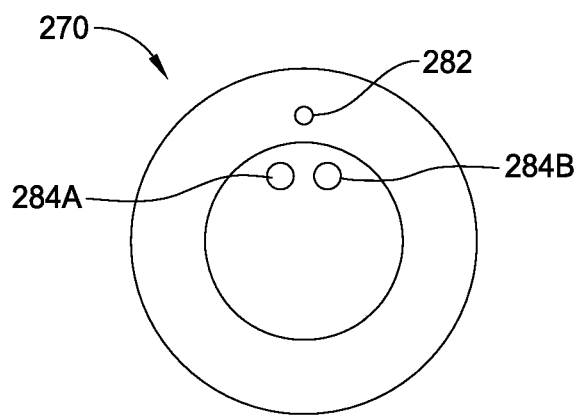
FIG. 2B is a section view of the angular displacement sensor taken along section line 2B-2B in FIG. 2.

FIG. 2A is a side view of a carrier sleeve 275. The carrier sleeve 275 surrounds the sensor assembly 250 and includes reset slots 277a, b in which alignment pins 255a, b are disposed. The reset slots 277a, b serve to reset the pins 255a, b both longitudinally and rotationally when the slickline 150 is pulled a minimal amount, such as one-half inch, while the anchors 210a, b are engaged to the drill string 30. FIG. 2B is a section view of the angular displacement sensor 270 taken along section line 2B-2B in FIG. 2. The angular displacement sensor 270 employs two sensor coils 284a, b placed close to each other in parallel and connected by a bridge circuit. A magnet pole piece 282 acts through the housing 260 and modulates the inductance of the sensor coils 284a, b, adjusting the voltage across the bridge circuit and being detected as an angular displacement.

In operation, the FPT 100 is run-in to the drill string to an estimated depth P of the cave in. The anchors 210a,b are set and a tensile load is applied to the drill string 30 from the surface 12. As the drill string 30 is placed in tension at the surface, the portion of the drill string 30 above the sticking point P will be elongated. The amount of elongation of the drill string 30 which is between the sticking point P and the upper anchor arms 225 will be detected by the LVDT 265. If the upper anchor arms 225 were located at a point below the sticking point P, there would be no elongation detected by the LVDT 265. If the lower anchor arms 225 were located at a point above the sticking point, the LVDT 265 would detect elongation of the entire portion of the drill string 30 between the upper anchor arms 225 and the lower anchor arms 225. By applying a known force at the surface to the drill string 30 and measuring the response of the LVDT 265, it can be determined if the anchor arms 225 of the FPT 100 are above, on either side, or below the sticking point P. In this manner, the location of the sticking point P/free point F may be precisely located.

Similarly, as the drill string 30 is placed in torsion at the surface, the portion of the drill string 30 above the sticking point P will be angularly displaced. The amount of angular displacement of the drill string 30 which is between the sticking point P and the upper anchor arms 225 will be detected by the ADS 270 in the dual sensor assembly 250 of the FPT 100. If the upper anchor arms 225 were located at a point below the sticking point P, there would be no angular displacement detected by the ADS 270. If the lower anchor arms 225 were located at a point above the sticking point, the ADS 270 would detect angular displacement of the entire portion of the drill string 30 between the upper anchor arms 225 and the lower anchor arms 225. By applying a known torsional force at the surface to the drill string 30 and measuring the response of the ADS 270, it can be determined if the anchor arms 225 of the FPT 100 are above, on either side, or below the sticking point P. In this manner, the location of the sticking point P/free point F may be precisely located.

The FPT 100 may be powered with positive voltage from the interface 200 (core positive relative to the armor). Negative voltage may be reserved for explosive or other desired operations, a feature which enhances the safe operation of the FPT 100. In addition, the anchor arms 225 may be commanded to open and close by pulsing the positive voltage supply (turn off momentarily and turn back on) and the sensor assembly 250 may run off a positive voltage supply only. The FPT 100 may be essentially turned off during negative voltage supply conditions.

A string shot (not shown) may also be deployed with the FPT 100. Because the FPT 100 is not fluid filled and does not include a pressure equalizer system there is no fluid communication between the tool and fluid in the wellbore. Because this communication is unnecessary, the FPT 100 is not as susceptible to damage from hydrostatic pressure caused by the ignition of a string shot explosion. A string shot includes an explosive charge designed to loosen a connection between two tubulars at a certain location in a wellbore. In the case of a tubular string that is stuck in the wellbore, a string shot is especially useful to disconnect a free portion of the tubular string from a stuck portion of the tubular string in the wellbore. For example, after determining a location in a wellbore where a tubular string is stuck, the nearest connection in the tubular string there above is necessarily unthreaded so that the portion of the tubular string which is free can be removed from the wellbore. Thereafter, additional remedial measures can be taken to remove the particular joint of tubular that is stuck in the wellbore.

A string shot is typically a length of explosive material that is formed into the shape of a rope and is run into the wellbore on an electrical wire. The string shot is designed to be located in a tubular adjacent that connection to be unthreaded. After locating the string shot adjacent the connection, the tubular string is rotated from the surface of the well to place a predetermined amount of torque on the string which is measurable but which is inadequate to cause any of the connections in the string to become unthreaded. With this predetermined amount of torque placed on the string, the string shot is ignited and the explosive charge acts as a hammer force on the particular connection between joints. If the string shot operates correctly, the explosion loosens the joints somewhat and the torque that is developed in the string causes that particular connection to become unthreaded or broken while all the other connections in the string of tubulars remain tight.

Alternatively, one or both of the anchor assemblies 210a, b may be deployed with the interface 200 without the sensor assembly 250. Additionally, one of the anchor assemblies 210a,b and another wireline tool, such as a perforation gun or a cutting tool 700, 800 may be deployed with the interface 200.

Figure 2C:
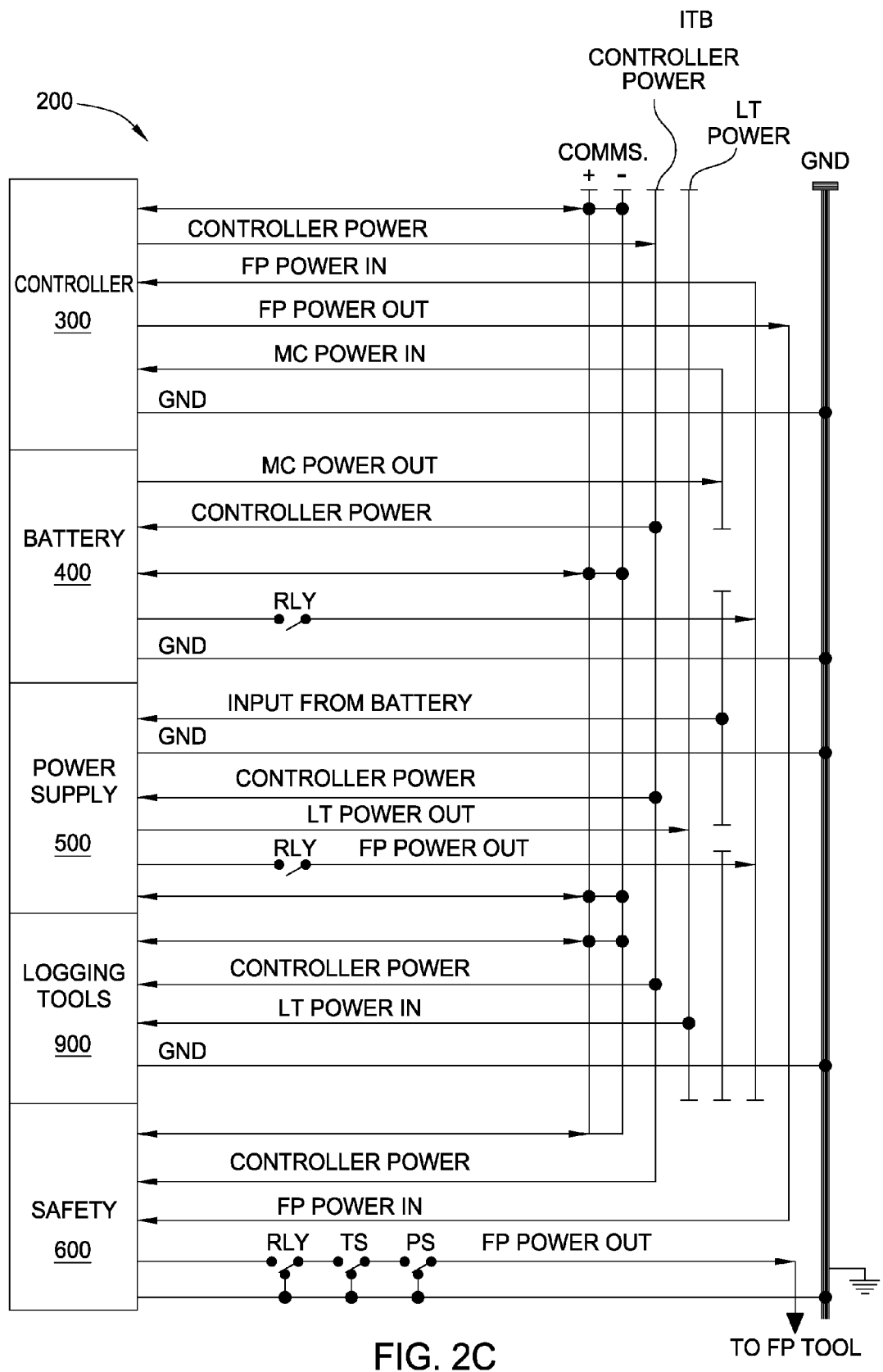
FIG. 2C is a schematic of the interface 200.

FIG. 2C is a schematic of the interface 200. The interface 200 may include a cable head 205, a controller module 300, a battery module 400, a power supply module 500, a crossover 206 or safety module 600, and a logging tool (LT) module 900. Each of the modules 300-600, 900 of the interface 200 communicates data with the other modules and transmits power to and/or receives power from the other modules via an inter-tool bus (ITB). The ITB includes a plurality of wires that extends through each of the modules 300-600, 900 of the interface 200. As shown, the ITB includes eight wires: a positive communications wire, a negative communications wire, a controller power wire, a logging tool (LT) power wire, a battery wire, two wireline tool (FP) power wires, and a ground wire. The battery wire may be separated into a main controller circuit, a power supply circuit, and an unused circuit by breaks in the battery module and the power supply module. Additionally, the ITB may include one or more additional ground wires. Alternatively, the ITB may include any number of wires, such as two to ten.

Figure 2D:
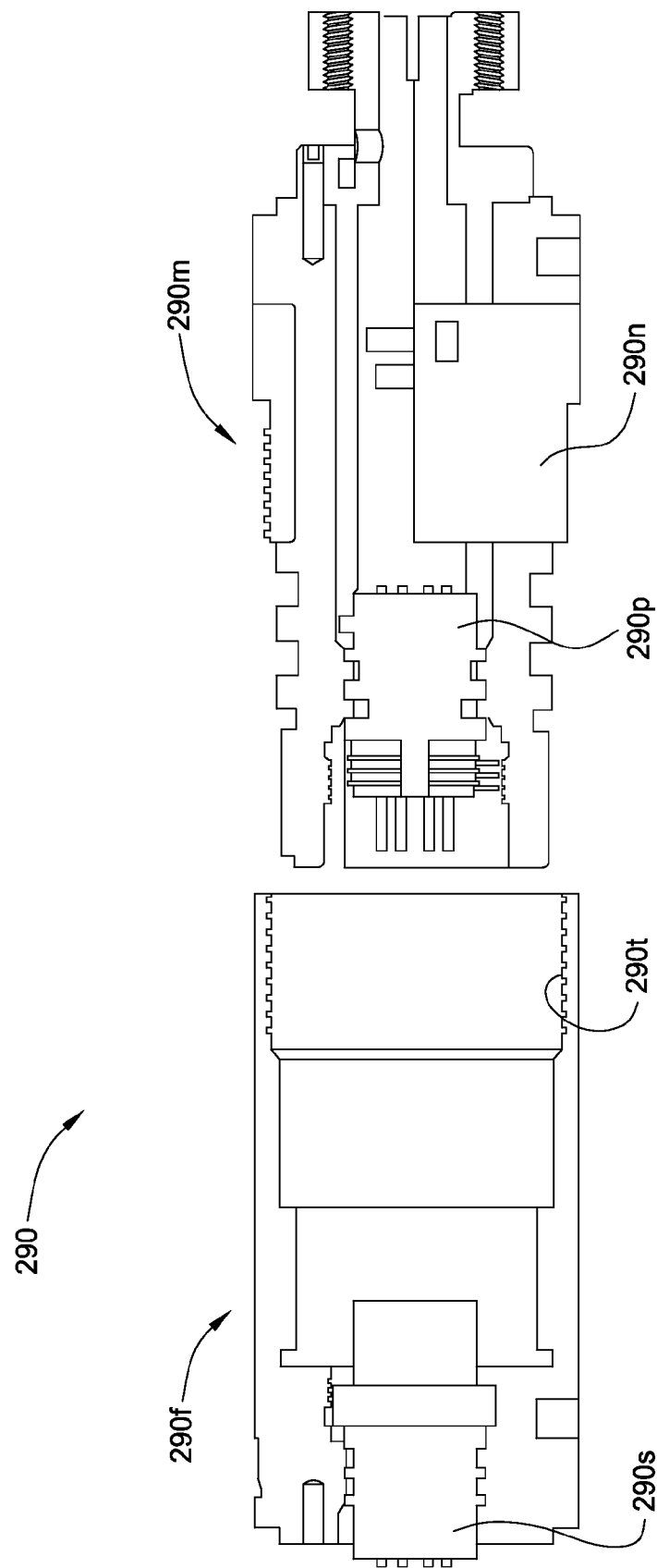
FIG. 2D is a side view of a field joint 290 for connection between modules of the interface.

FIG. 2D is a side view of a field joint 290 for connection between modules 300-600, 900 of the interface 200. Each field joint 290 includes a male end 290m and a female end 290f. The female end 290f includes a tubular housing and a socket 290s disposed in the housing and having a plurality of pins, such as ten (shown). Each wire of the ITB corresponds to a respective pin. The extra pins may not be used or may be used for additional ground wires. The male end 290m includes a tubular housing and a plug 290p disposed in the housing and having a corresponding number of holes for receiving the pins. The male end 290m further includes a threaded coupling 290n disposed around the housing and longitudinally coupled thereto. The threaded coupling 290n is free to rotate about a longitudinal axis of the housing. The female end 290f includes corresponding threads 290t formed on an inner surface of the housing for engagement with the threaded coupling 290n. The male end may include one or more o-rings disposed in one or more grooves formed in an outer surface of the housing to seal against the inner surface of the female end housing.

Figure 2E:
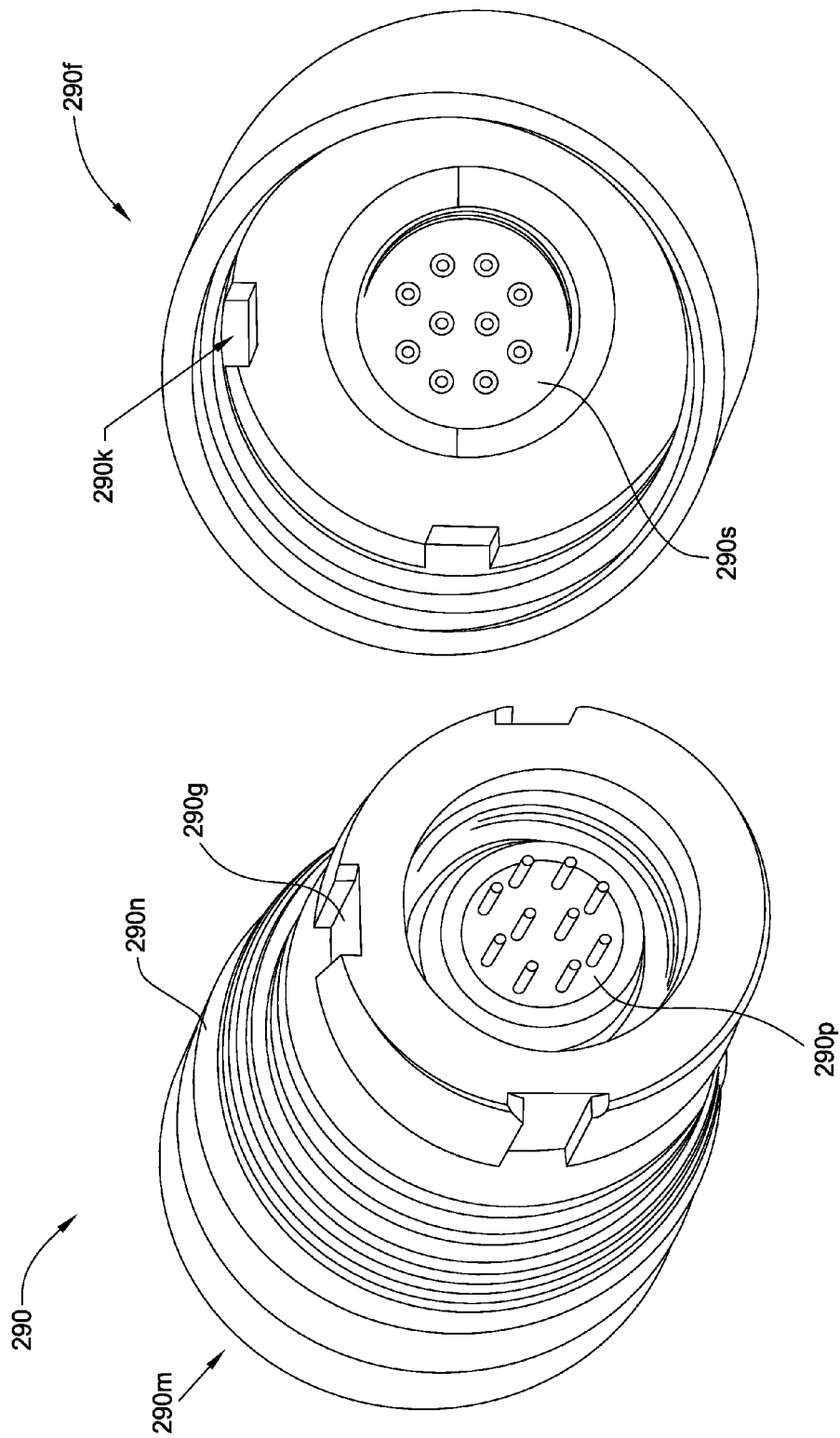
FIG. 2E is an end view of the male and female ends of the field joint.

FIG. 2E is an end view of the male 290m and female 290f ends of the field joint 290. The female end 290f includes a plurality, such as three, keys 290k formed in an inner surface of the housing. The male end 290m includes a corresponding number of slots 290s formed in an outer surface of the housing. Mating of the keys 290k with the slots 290g ensures alignment of the pins with the corresponding holes. To make up the field joint 290, the male end is inserted into the female end so that the keys are received by the corresponding grooves until the threads of the coupling engage with the threads formed in the female housing. The coupling 290n is then rotated which will longitudinally advance the male end 290m into the female end 290f, thereby inserting the pins into the slots.

Each module of the interface 200, except the safety module 600 and controller module 300, may have a male end and a female end. Each module of the interface 200 is enclosed in a tubular housing made from a metal or alloy, such as steel, stainless steel, or a corrosion resistant specialty alloy for severe applications. The end housings may be formed with housings of the respective modules or they may be welded thereto. The end housings may be made from the same material as the module housings. The controller module 300 may have one of the male and female ends at a second end and may simply have a threaded coupling at a first end for connection to the cable head. Alternatively, the cablehead 205 may be a separate module connected to the ITB. In this alternative, the controller module 300 would have male and female ends and the cablehead would have one of the male and female ends. The safety module 600 and crossover 206 may have one of the male and female ends at a first end and may simply have a coax connector, such as a Gearhardt pin (GO) connector, at a second end for connection to the upper anchor assembly 210a.

Figure 3:
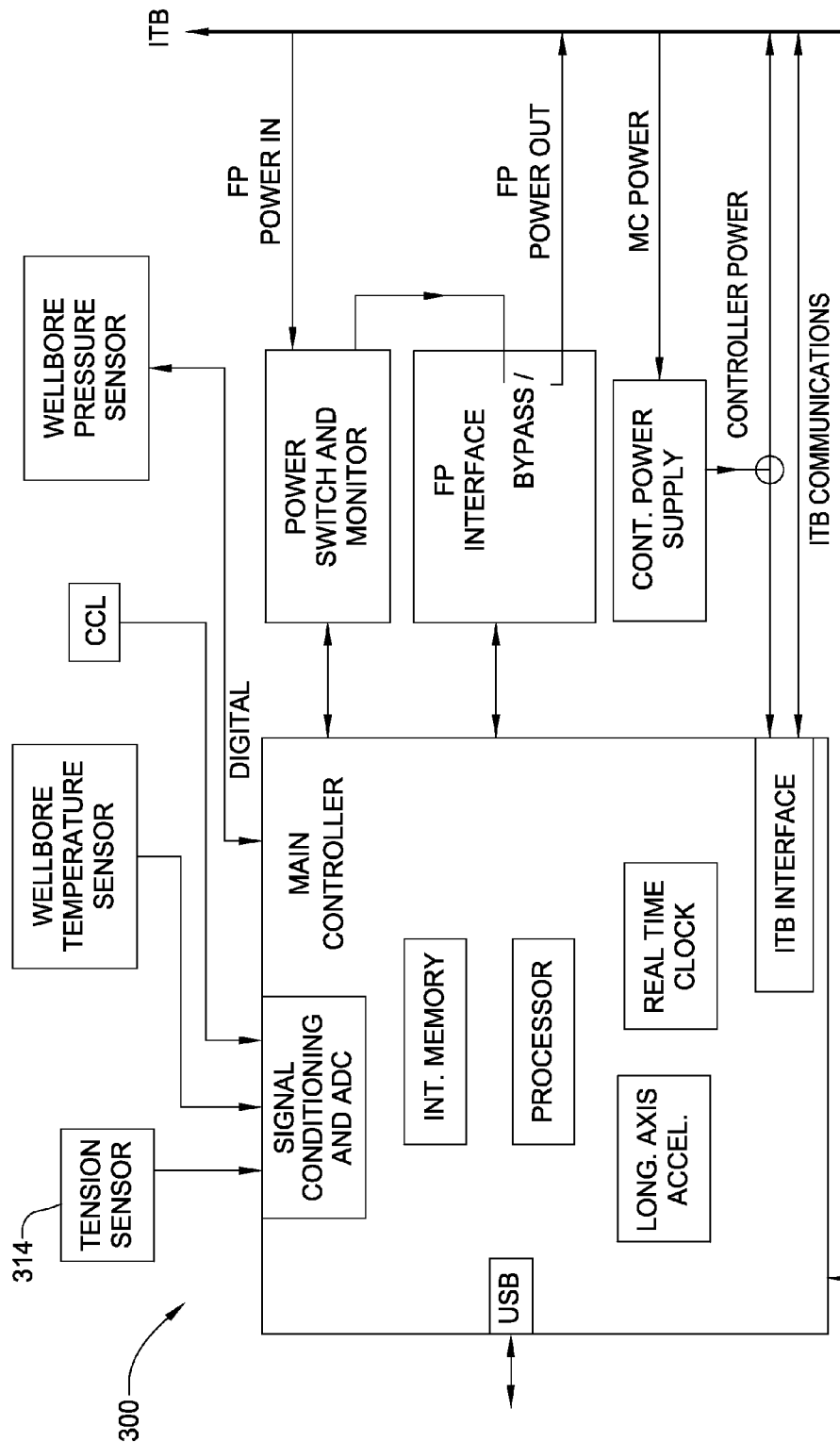
FIG. 3 is a schematic of the controller module.

FIG. 3 is a schematic of the controller module 300. The controller module may include a main controller, pressure sensor, a temperature sensor, a casing collar locator (CCL), a tension sensor, external memory, a controller power supply, a wireline tool (FP) interface, and a power switch and monitor. The CCL may be a passive tool that generates an electrical pulse when passing variations in pipe wall, such as a collar of the drillstring 30 within the wellbore 15. The main controller may include a processor, internal memory, an accelerometer, a real time clock, an ITB interface, a USB interface, an analog to digital converter (ADC), and a digital sensor interface. The main controller communicates with and directs the operation of the other modules of the interface 200 via the ITB. The FP interface allows the main controller to provide power to, and control or to collect data from wireline tools, such as the FPT 100. The pressure sensor is in fluid communication with the wellbore and in data communication with the main controller, thereby allowing the main controller to monitor wellbore pressure. The temperature sensor is in fluid communication with the wellbore and in data communication with the main controller, thereby allowing the main controller to monitor wellbore temperature.

The accelerometer is in data communication with the main controller, thereby allowing the main controller to detect acceleration of the interface 200 along a longitudinal axis thereof. The CCL is in data communication with the main controller, thereby allowing the main controller to monitor depth of the interface 200 in the wellbore. The tension sensor 314 may be located in the cablehead 205 and is in data communication with the main controller, thereby allowing the main controller to monitor tension in the slickline 150. The internal memory stores data from the sensors and pre-programmed instructions from the surface 12. The external memory unit is in data communication with the main controller and provides additional storage capacity for logging data when the LT module 900 is used.

The USB interface allows for retrieval of stored data from the internal memory and/or external memory when the interface 200 is retrieved at the surface. The USB interface also provides for programming of the interface 200 with run-time parameters before a logging operation or other intervention service activity, diagnostics, or installation of firmware upgrades. The USB interface may be accessible from an end of the controller module 300 proximate to the cablehead by removing the cablehead. The clock allows the main controller to timestamp acquired data which may then be merged with surface collected time/depth data file for correlation purposes. The controller power supply receives electricity from the battery module 400 via the ITB and outputs a power signal, such as 12 VDC, to the controller power line of the ITB.

Figure 4:
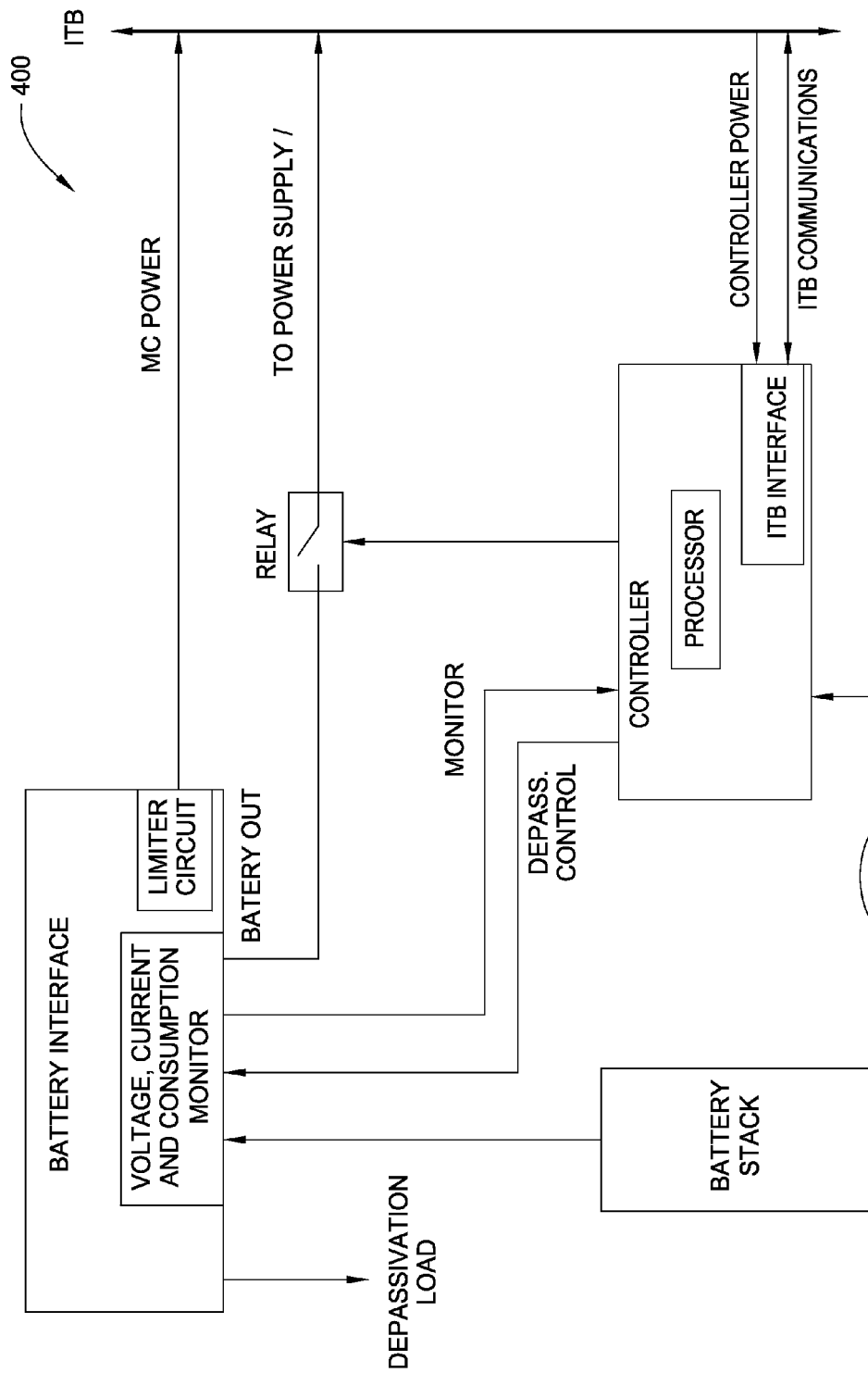
FIG. 4 is a schematic of the battery module.

FIG. 4 is a schematic of the battery module 400. The battery module may include a battery stack, a battery interface, a controller, and a depassivation load. The battery stack includes a plurality of batteries, such as lithium cells. For example, the battery stack may include a plurality, such as ten to twenty, DD lithium cells assembled in series in one or more staves (i.e., ten cells in a stave), such as a fiberglass tube. The controller includes a processor, memory, and an ITB interface. The battery interface may include sensors for monitoring charge of the battery stack, such as a voltage sensor, a current sensor, and a consumption monitor. The controller is in data communication with the battery interface for monitoring performance of the battery. The consumption monitor may provide a real time estimate of the remaining charge in the battery stack so that a surface operator may know if the battery stack is suitable for performing an intended job or if replacement is needed. The temperature gage is in communication with the battery stack and in data communication with the battery controller, thereby allowing the battery controller to monitor the temperature of the battery stack.

The battery interface receives electricity from the battery stack and outputs a first signal to the controller module via the ITB. The battery interface also outputs a second signal to the power supply module to the ITB. A relay is disposed in the second signal line. The relay allows the main controller (via the ITB and the battery controller) to control when electricity to the power supply is provided. The electricity to the controller module may be unconditionally provided (or always on). The depassivation load allows for quick turn-on of the battery stack to supply power at rated discharge rate. The battery module may also include a vent in the housing that may be actuated on the surface without dismantling any component of the interface.

Figure 5:
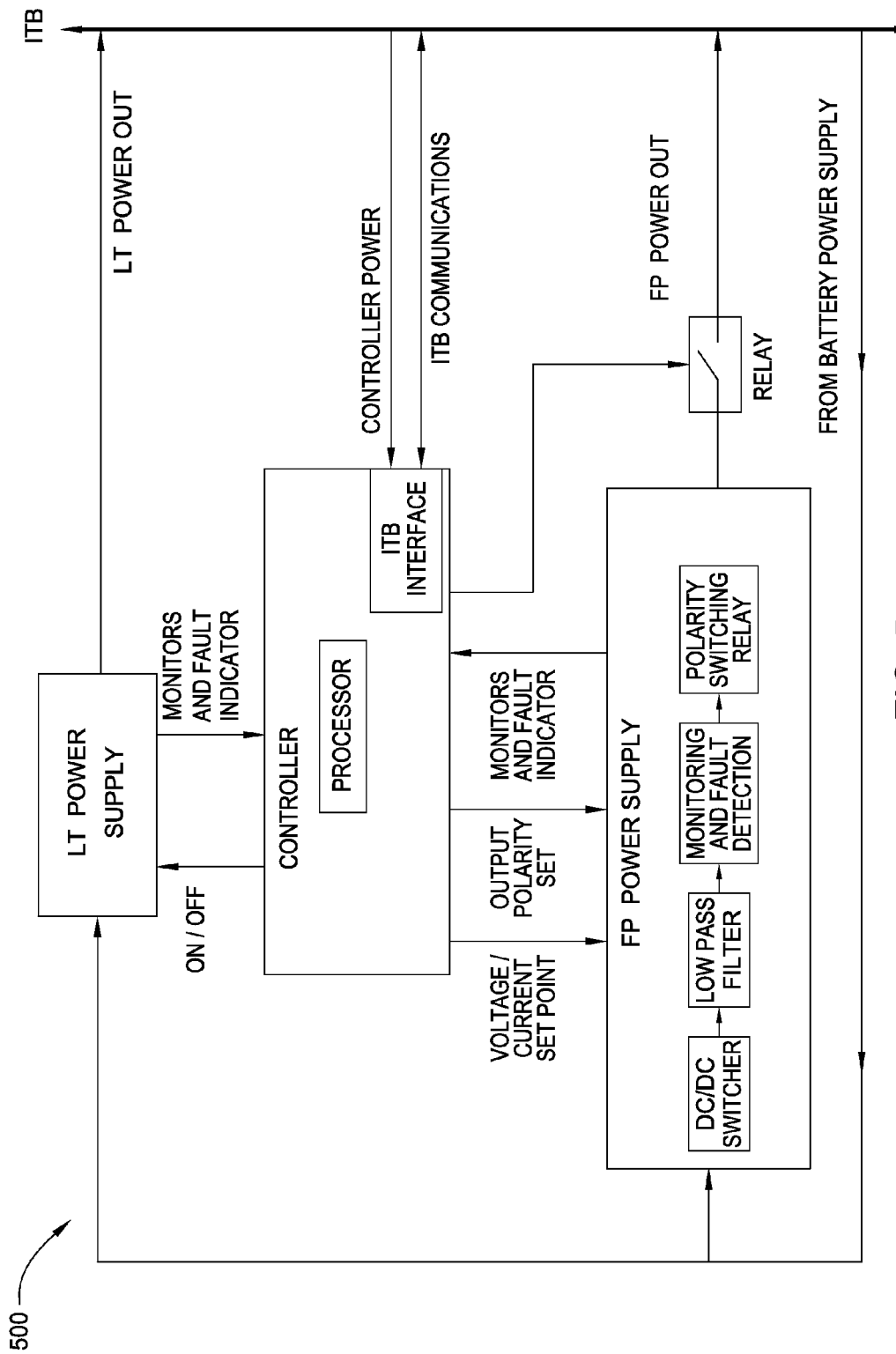
FIG. 5 is a schematic of the power supply module.

FIG. 5 is a schematic of the power supply module 500. The power supply module 500 may include a controller, a logging tool (LT) power supply and a wireline tool (FP) power supply. The power supply module receives electricity from the battery module 400 via the ITB and outputs a first electric signal to the LT power line of the ITB and a second electric signal to the FP power out line of the ITB. The controller may include a processor and an ITB interface. The controller is in data communication with the LT power supply and the FP power supply. The LT power supply may be a simple fixed voltage, such as 100 VDC, power supply. The FP power supply may be an adjustable voltage and current power supply and include a DC/DC switcher, a low pass filter, a monitoring and fault detection unit, and a polarity switching relay. The main controller may set the output voltage or current of the FP power supply via the ITB and the power supply controller. The output line of the FP may include a relay in communication with the power supply controller. The power supply controller may also switch on or off the LT power supply and monitor performance thereof.

The FP power supply may be adjustable over a wide range, such as 50 to 130 VDC in voltage control mode or 0 to 1.5 A in current control mode. Since the polarity may be reversible, the range may be increased to −50 to −130 VDC and +50 to +130 VDC and 1.5 A to −1.5 A. This allows flexibility for operating various wireline tools with the interface at different voltages so multiple wireline tools may be deployed with the interface and operated at different times. For example, an inflation tool 1000a may operate at +130 VDC, the cutting tool 700 at +130 VDC, a radial cutting torch 800 at 1-1.5 A, the FPT at +75 VDC, and a perforating gun at −60 VDC. The main controller may instruct the FP power supply to supply the operating voltage/current of a given wireline tool according to a predetermined power control sequence in order to control different functions of the tool. For example, given the FPT 100, a first power control sequence may instruct the FPT to set the anchor assemblies 210a,b and a second power control sequence may instruct the FPT to retract the anchor assemblies. Data may be transmitted along the coax wireline as power is also being transmitted along the coax wireline between the interface and the wireline tools using any multiplexing technique.

Figure 5A:
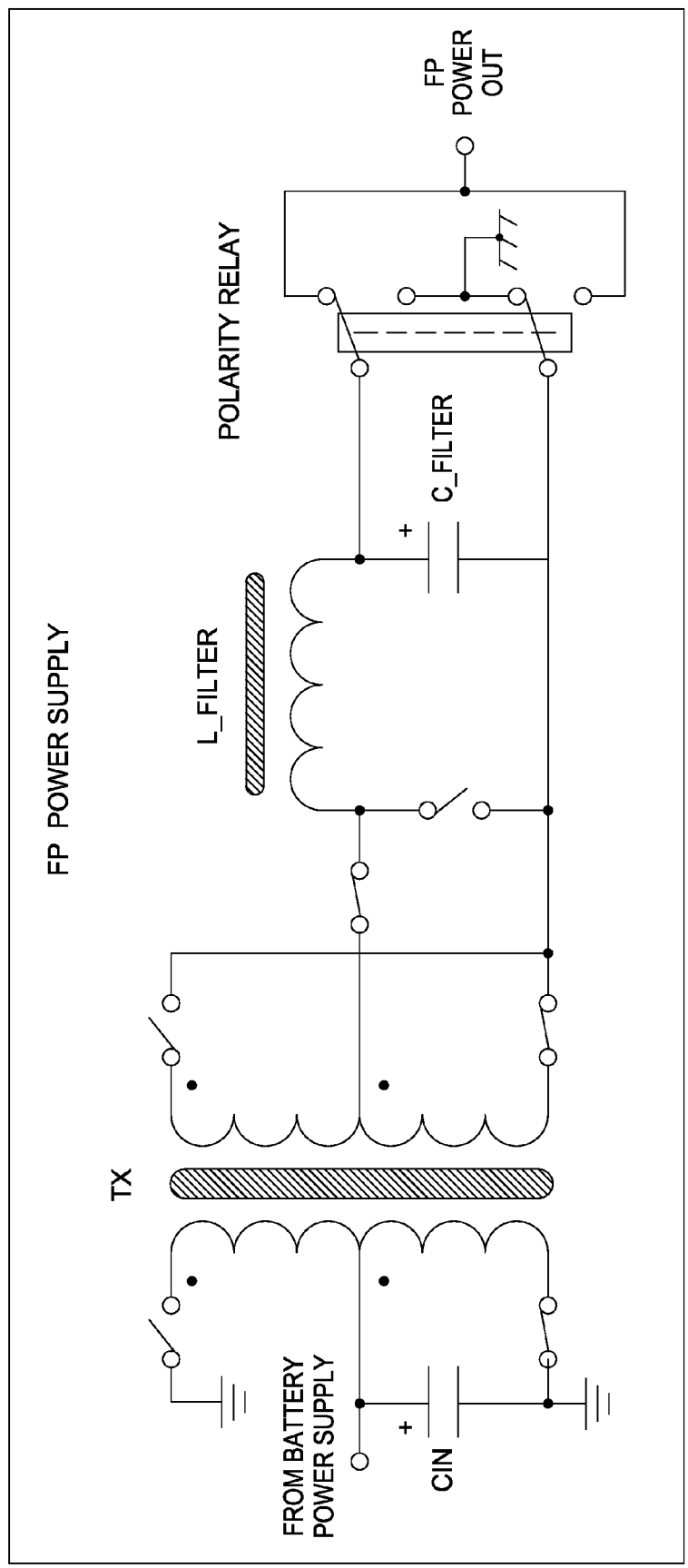
FIG. 5A is a circuit diagram of the FP power supply.

FIG. 5A is a circuit diagram of the FP power supply. The DC/DC switcher may be a forward mode inverter. The DC/DC switcher may include zero voltage transistor switching on primary transistors and be operated in a pull-pull arrangement. The primary transistors may be operated at a 50/50 duty cycle to allow free running. The DC/DC switcher may operate at high frequency to reduce size requirements for the transformer and allow resonant operation. Secondary regulation may be achieved by pulse-width modulation. The DC/DC switcher may include synchronous output rectification and include a micro-controller.

Alternatively, the LT power supply may be replaced by an adjustable power supply with a power sharing circuit between the LT and FP power supplies. This alternative would allow for a doubling of the output power capability for wireline tools when power for the logging tools is not required. When power for the LT tools is required, the adjustable LT power supply would simply be switched to the LT line of the ITB and operated as a fixed voltage supply.

Alternatively, the controller power supply may be located in the power supply module instead.

Figure 6:
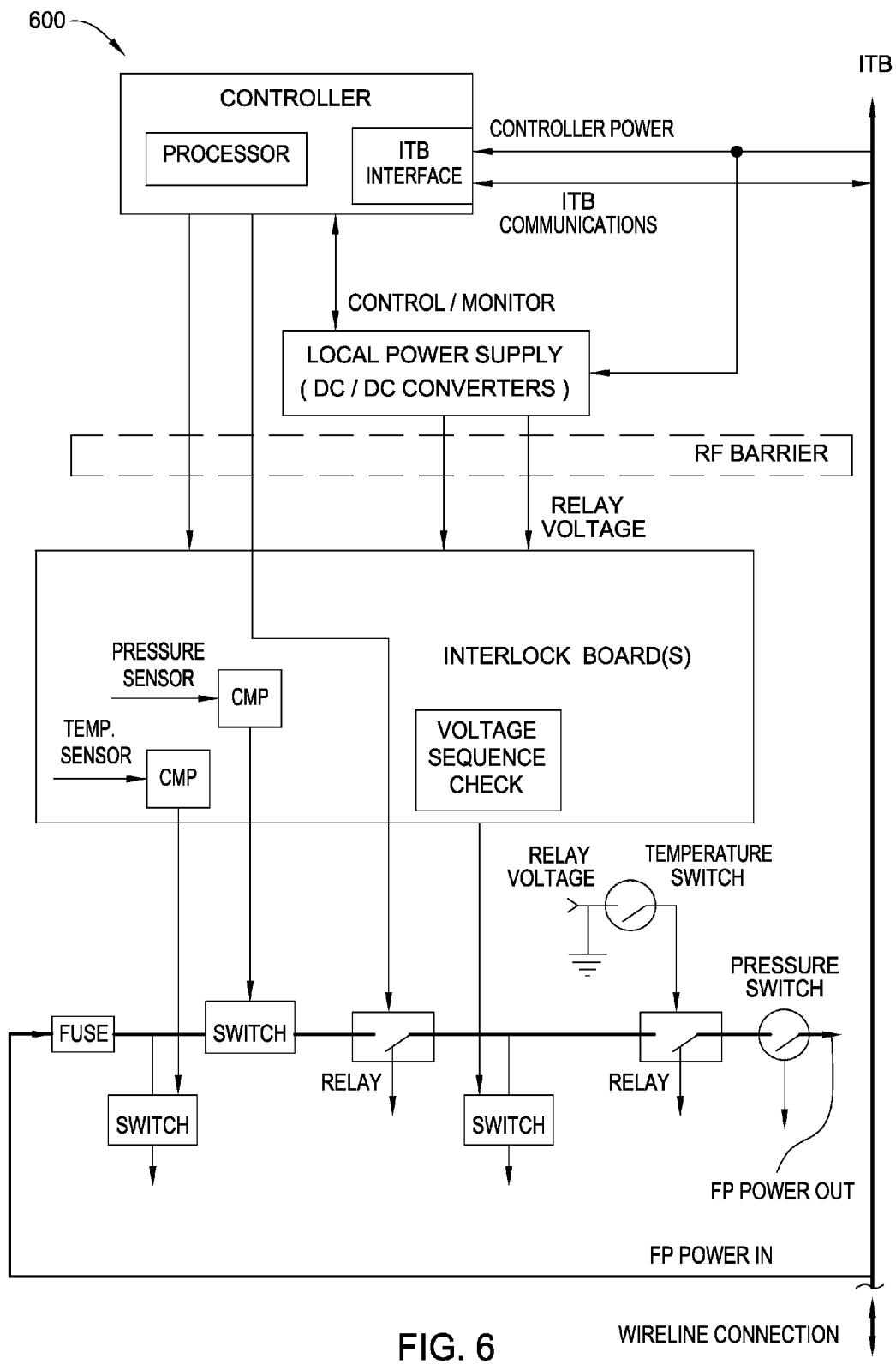
FIG. 6 is a schematic of the safety module.

FIG. 6 is a schematic of the safety module 600. The safety module 600 may include a controller, an interlock, a pressure switch, a temperature switch, a controller relay, an RF barrier, and a crossover. As discussed above, the safety module includes a field joint for connection to other modules of the interface 200 at a first end and a coax (i.e., GO pin) connector at a second end for connection to wireline tools. The safety module maintains a break in the FP power connection between the interface 200 and the wireline tools until certain conditions are satisfied so that wireline tools are not unintentionally operated at the surface. The crossover 206 may be used instead of the safety module 600 for wireline tools which do not present a hazard to surface personnel if the wireline tool is unintentionally operated at the surface.

The controller includes a processor and an ITB interface. The controller is also in data communication with the interlock, the controller relay, and a local power supply. The local power supply receives controller power and outputs a signal to the interlock board and a signal to the temperature switch. The pressure and temperature switches are mechanically operated once a certain minimum pressure (i.e., 200 psi) and temperature (i.e., 100 F) are met. This ensures power is not supplied to any wireline tools until the interface and the wireline tools reach a minimum safe depth in the wellbore and are not still on the surface. The controller relay is operable by the main controller via the ITB and the safety controller once the main controller determines that the interface 200 has reached operational depth in the wellbore (discussed below).

The interlock may include a pressure sensor, a temperature sensor and comparison circuits to electronically verify that the interface 200 has reached the minimum safe depth. Additionally, the interlock minimums may be higher than the mechanical switch minimums. The interlock may further include a voltage sequence check to verify that the interface 200 is operating properly before allowing power to the wireline tools.

In operation, the main controller is programmed at the surface to perform an operation with one or more wireline tools and/or one or more logging tools. For example, the interface 200 may be assembled with the FPT 100. The interface and FPT are run into the wellbore. The main controller monitors for a trigger event. The trigger event may be a predetermined time, a temperature, a pressure, a number of casing collars counted, a change in tension of the slickline, and/or an acceleration of the interface 200 (i.e., caused by jerking the slickline from the surface). Alternatively, as previously described, the trigger event may be generated by lowering a slip ring device (not shown) down the slickline 150 to contact a switch (not shown) on the cablehead.

In response to detecting the trigger event, the main controller instructs the battery controller to close the relay in the power supply output line and instructs the power supply controller to close the relay and supply a predetermined voltage from the FP power supply and to activate the LT power supply (if the LT module 900 is present). If a chemical cutter or RCT were included with the FPT, the main controller may instruct the safety sub to close the relay (the pressure and temperature switches automatically closed when wellbore conditions were detected). The main controller instructs the LT power supply to output the first voltage sequence to set the anchor assemblies. The surface may verify setting of the anchor assemblies by releasing the wireline. This may also provide a signal to the main controller that the surface is ready to begin the freepoint test. Alternatively, the main controller may just wait for a predetermined time.

The main controller may then continue supplying power to the FPT while surface personnel exert tension/torque on the drill string while the FP interface receives data transmitted by the LVDT/ADS and records the data to memory. After the test is complete, the main controller instructs the FP power supply to output the second voltage control sequence, thereby retracting the anchor assemblies. The surface may indicate to the main controller by applying tension to the slickline. The surface would then raise/lower the slickline to the next testing depth and the process would then be repeated. The main controller may have a preprogrammed number of tests or monitor for a trigger event from the surface to determine when testing is concluded. Once testing is concluded, the interface and the FPT may be retrieved to the surface and the data may be downloaded from the main controller for analysis.

Additionally, one of the cutting tools 700, 800 may be included. The main controller may analyze data received from the LVDT/ADS to detect the free point F. When the freepoint is detected, the main controller may operate the cutting tool to sever the drillstring. The main controller may carry the cutting operation out autonomously or first send a signal to the surface. Since no telemetry module is present, the main controller may use a crude mechanical signal, such as not retracting the anchor assemblies. The surface may verify that the anchor assemblies were not retracted due to mechanical failure by jerking on the slickline a predetermined number of times, such as twice, quickly. The main controller may detect the response and confirm by retracting the anchors. The surface could confirm by raising or lowering the interface 200. Once the surface has confirmed the freepoint has been located, the surface may send another signal to the main controller, i.e., jerking the slickline three times, to instruct the interface to operate the cutting tool.

Figure 7A:
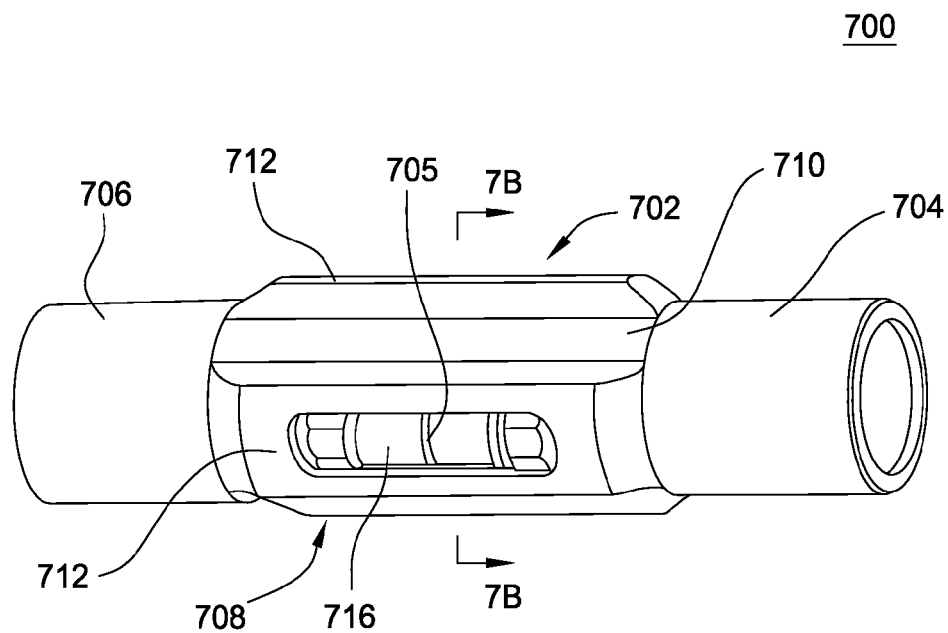
FIG. 7A illustrates another wireline tool, such as a cutting tool that may be deployed using the interface, according to an alternative embodiment of the present invention.
Figure 7B:
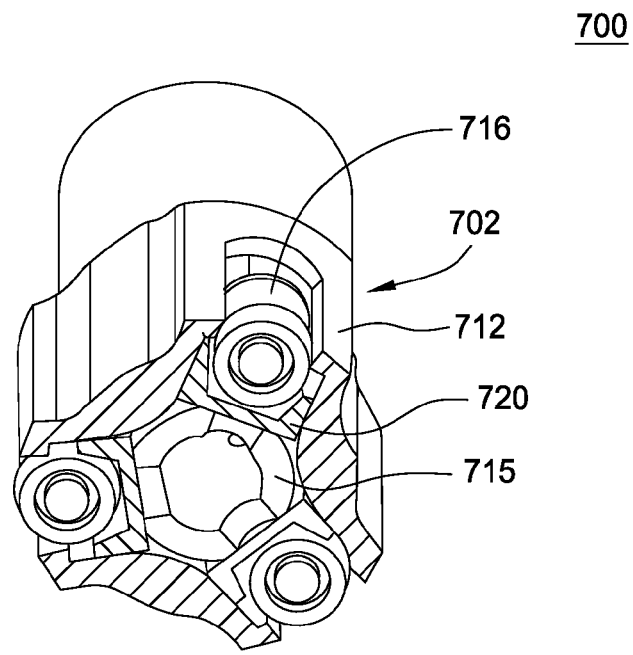
FIG. 7B is a cross-sectional view of the cutting tool and FIG. 7C is an exploded view of the cutting tool.
Figure 7C:
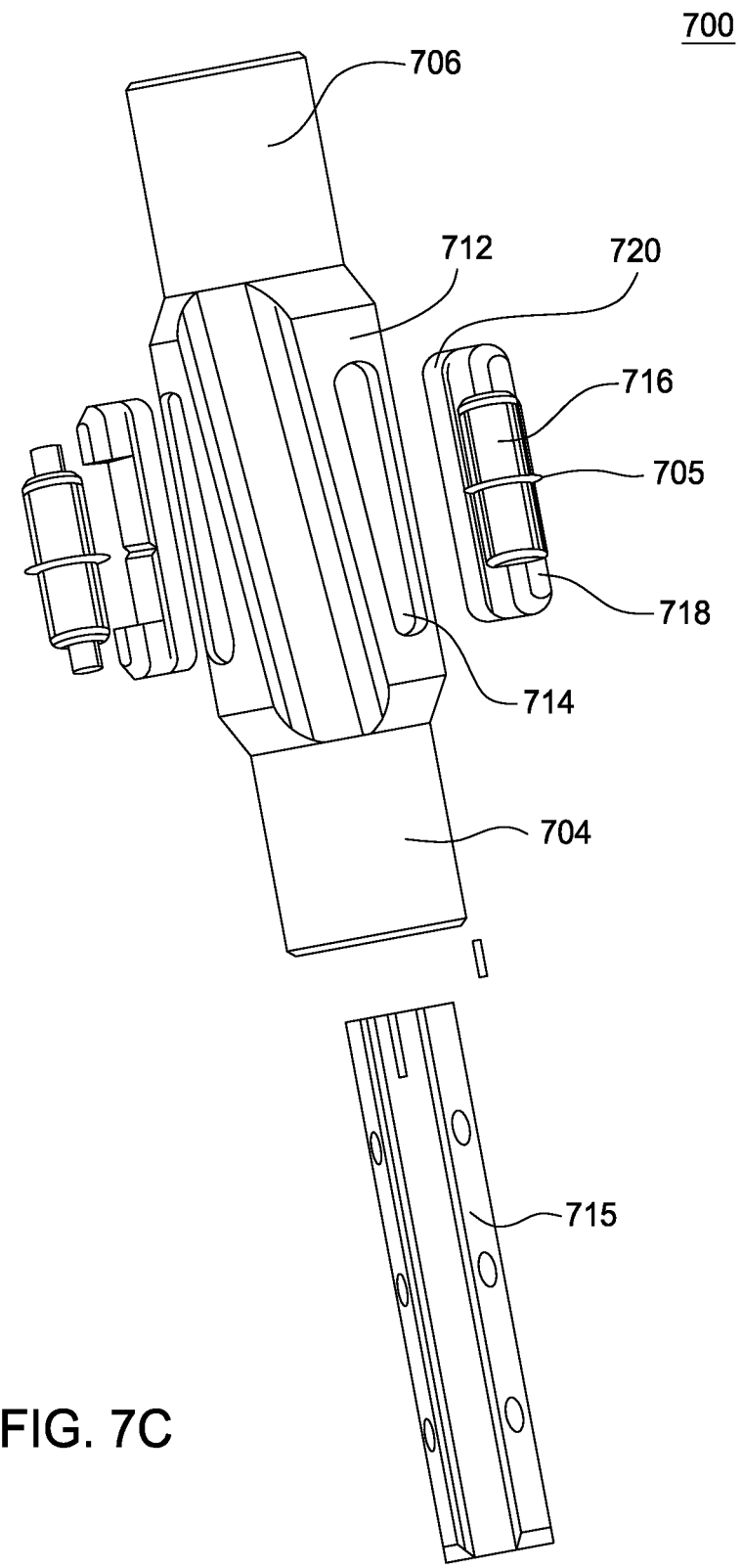

FIG. 7 illustrates another wireline tool, such as the cutting tool 700 that may be deployed using the interface 200, according to an alternative embodiment of the present invention. FIG. 7B is a cross-sectional view of the cutting tool 700 and FIG. 7C is an exploded view of the cutting tool 700. The cutting tool 700 further includes a pump (not shown) and a motor (not shown). The pump may be the inflation tool 1000a. The tool 700 has a body 702 which is hollow and generally tubular with conventional screw-threaded end connectors 704 and 706 for connection to other components (not shown) of a downhole assembly. The end connectors 704 and 706 are of a reduced diameter (compared to the outside diameter of the longitudinally central body part 708 of the tool 700), and together with three longitudinal flutes 710 on the central body part 708, allow the passage of fluids between the outside of the tool 700 and the interior of a tubular therearound (not shown).

The central body part 708 has three lands 712 defined between the three flutes 710, each land 712 being formed with a respective recess 714 to hold a respective roller 716. Each of the recesses 714 has parallel sides and extends radially from the radially perforated tubular core 715 of the tool 700 to the exterior of the respective land 712. Each of the mutually identical rollers 716 is near-cylindrical and slightly barreled with a single blade 705 formed thereon. Each of the rollers 716 is mounted by means of a bearing 718 (FIG. 7C) at each end of the respective roller for rotation about a respective rotation axis which is parallel to the longitudinal axis of the tool 700 and radially offset therefrom at 120-degree mutual circumferential separations around the central body 708. The bearings 718 are formed as integral end members of radially slidable pistons 720, one piston 720 being slidably sealed within each radially extended recess 714. The inner end of each piston 720 (FIG. 7B) is exposed to the pressure of fluid within the hollow core of the tool 700 by way of the radial perforations in the tubular core 715.

By suitably pressurizing the core 715 of the tool 700 with the pump, the pistons 720 can be driven radially outwards with a controllable force which is proportional to the pressurization, thereby forcing the rollers 716 and blades 705 against the inner wall of a tubular. Conversely, when the pressurization of the core 715 of the tool 700 is reduced to below the ambient pressure immediately outside the tool 700, the pistons 720 (together with the piston-mounted rollers 716) are allowed to retract radially back into their respective recesses 714. Although three rollers 716 are shown, the cutting tool 700 may include one or more rollers 716.

In operation, the FPT 100, the interface 200, and the cutting tool 700 may be run into the wellbore on the slickline 150. The slickline 150 serves to retain the weight of the tools 100, 200, 700. After the FPT 100 determines the sticking point in a manner described above, the cutting tool 700 may be positioned at the desired point of separation. Thereafter, power may be supplied by the interface 200 to actuate the pump to provide pressurized fluid to the cutting tool 700. The pressure forces the pistons 720 and the rollers 716 with their cutters 705 against the interior of the tubular. Then, the cutting tool 700 is rotated in the tubular by the motor, thereby causing a groove of ever increasing depth to be formed around the inside of the tubular 750. With adequate pressure and rotation, the tubular is separated into an upper and lower portions. Thereafter, the rollers 716 are retracted and the tools 100, 200, 700 may be removed from the wellbore. Additionally, the cutting tool 700 is capable of making a plurality of cuts at different locations along the tubular string during the same trip. For example, a first cut may be made at the detected freepoint and then a second cut may be made at a predetermined distance along the tubular toward the surface from the first cut, such as thirty feet, as a redundant measure to ensure a second trip does not have to be made to free the drillstring.

Alternatively, the interface 200 and cutting tool 700 may be deployed in a subsequent trip once the location of the FP is known.

Figure 8A:
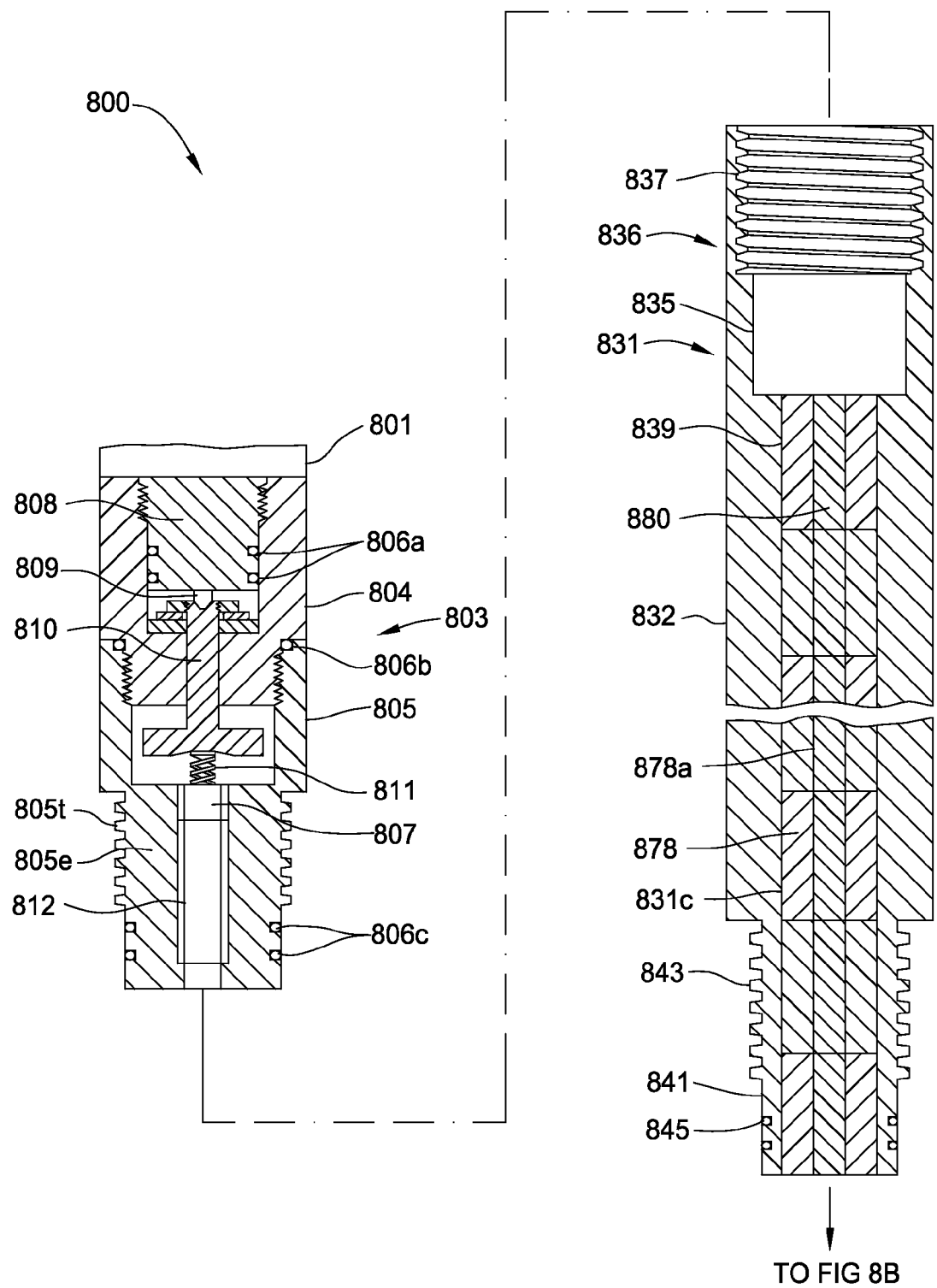
FIGS. 8A and 8B illustrate another wireline tool, such as a radial cutting torch, which may be deployed using the interface, according to an alternative embodiment of the present invention.
Figure 8B:
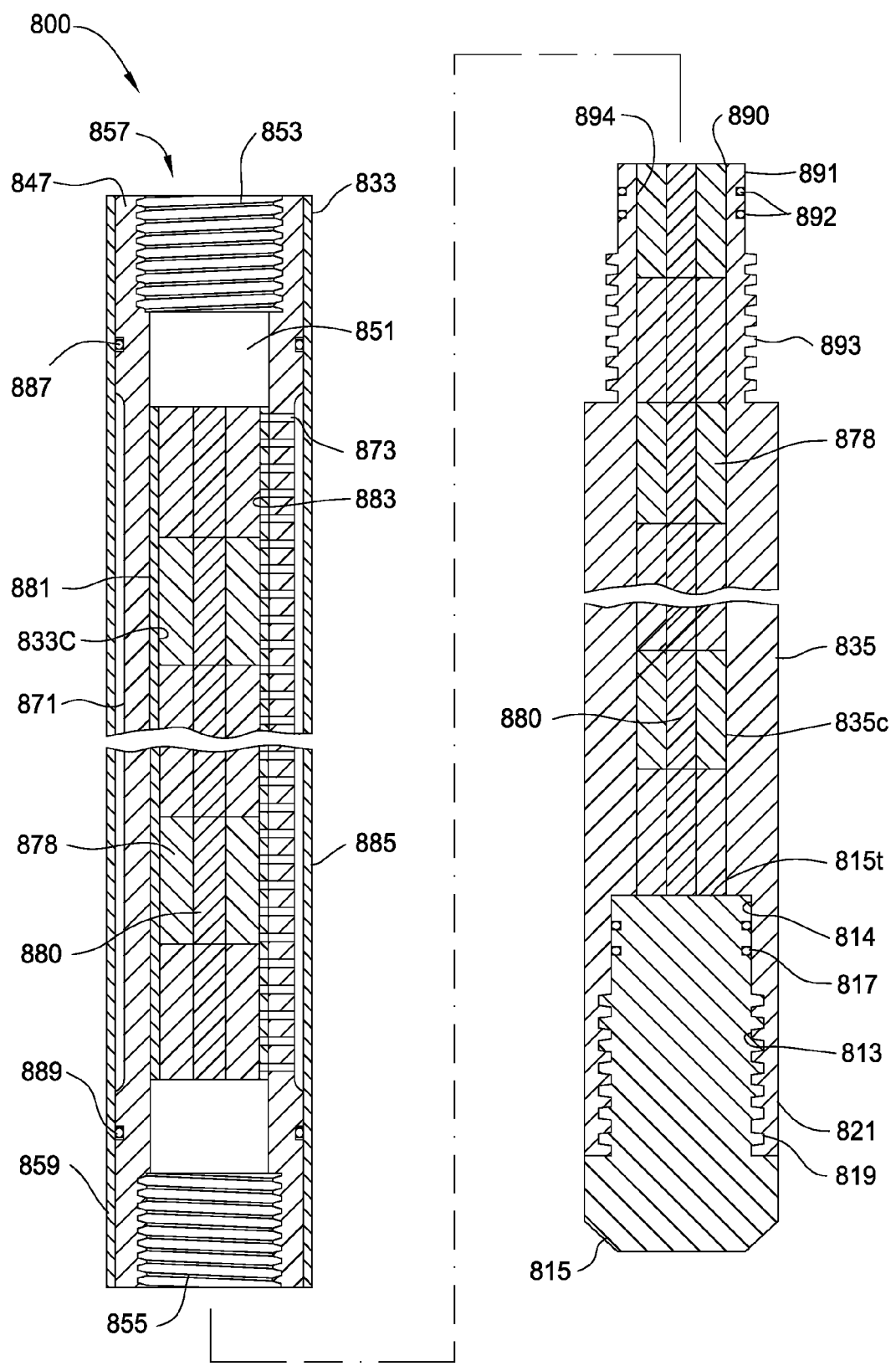

FIGS. 8A and 8B illustrate another wireline tool, such as a radial cutting torch 800, which may be deployed using the interface 200, according to an alternative embodiment of the present invention. The radial cutting torch 800 includes a connector subassembly 801, an ignition subassembly 803 including members 804 and 805, an upper combustible charge holding subassembly 831, a nozzle and intermediate combustible charge holding subassembly 833 and a lower combustible charge holding subassembly 835. Members 804, 805, 831, 833, and 835 may be formed of suitable metal or alloy.

The connector subassembly 801 has a lower end coupled to the ignition subassembly 803. The ignition subassembly comprise metal or alloy members 804 and 805 screwed together with an electrode plug 808 coupled to member 804. The electrode 808 has a prong 809 which engages an electrical conductor 810 supported by the lower end of member 804. A metal or alloy spring 811 is disposed between the conductor 810 and an electrically actuated igniter or squib 807 which is located in a small aperture 883 extending through the lower end 805e of member 805. Members 806a, 806b, and 806c are O-ring seals. The members 808-811 are electrically insulated to prevent a short. This ignition system may be defined as an electric line firing system.

Member 831 has annular wall 832 with an enlarged opening 835 at its upper end 836 with threads 837 leading to a smaller opening 839. The lower end 841 member 831 has exterior threads 843 end O-ring seals 845. The nozzle subassembly 833 comprises an annular wall 847 with a cylindrical opening 851 formed therethrough with interior threads 853 and 855 at its upper and lower ends 857 and 859. The wall 847 comprises a nozzle section 871 having a smaller outside diameter than the ends 847 and 859. A plurality of rows of apertures 873 extend through the wall section 871 and are circumferentially spaced therearound. Located on the inside of the wall section 871 is a hollow cylindrical shield 881 having apertures 883 formed therethrough which are aligned with the apertures 873. A thin metal sleeve 885 is secured around the outer wall 847 to prevent water from entering the apertures 873 and 883. Members 887 and 889 are O-ring seals.

The lower subassembly 835 comprises an annular wall 890 having an upper end 891 with O-ring seals 892 and exterior threads 893. A cylindrical aperture 894 extends into the member 835 to a larger diameter opening 814 having interior threads 813. A metal plug 815 with O-ring seals 817 and exterior threads 819 is inserted into the opening 814 and screwed into the lower end 821 of the member 835.

Also provided are a plurality of combustible pyrotechnic charges 878 made of conventional material which is compressed into donut shaped pellets. The combustible material may be thermite or another mixture of a metal or alloy and an oxide. Each of the charges has a cylindrical outer surface and a central aperture 878a extending therethrough. The charges 878 are stacked on top of each other within the annular inside chamber portions 831c, 833c (inside of the carbon sleeve 881) and 835c with their apertures 878a in alignment. Loosely packed combustible material 880 preferably of the same material used in forming the charges 878 is disposed with the apertures of the charges 878 such that each charge 878 is ignited from the loosely packed combustible material upon ignition by the ignition means 807.

In assembling the components 803, 831, 833, and 835, the threads 893 of end 890 of member 835 are screwed into threads 855 of the open end 859 of member 833; the threads 843 of end 841 of member 831 are screwed to the threads 853 of the open end 857 of member 833. During the assembly process, the charges 878 are stacked into the chamber portions 835c, 833c, and 831c of members 835, 833, and 831. The threads 805t of end 805e of assembled member 803 are screwed to the threads 837 of the open end 836 of the member 831. During the assembly process the charges 878 are stacked on each other from the top end 815t of the plug 815 and the material 880 placed in their apertures 878a.

An electrically insulated electrical lead is coupled to the igniter 807 by way of members 808-811 and an electrically insulated ground or return lead 896 coupled to the igniter 807. An electrical power source 897 and a switch 898 are provided for applying electrical power to the igniter 807 when the switch 898 is closed. The igniter 807 includes an electrical resistor which generates heat when electrical current is applied thereto. Thus when switch 898 is closed, current is applied to the resistor of the igniter 807, which generates enough heat to ignite the material 880 and hence the charges 878 to generate a very high temperature flame with other hot combustion products which pass through the heat shield apertures 883 and the nozzle apertures 873 and through the thin sleeve 885 to cut the drill string 30.

An alternative embodiment of the radial cutting torch is discussed in U.S. Pat. No. 4,598,769, which is hereby incorporated by reference in its entirety. Alternatively, a jet cutter or chemical cutter may be used instead of the radial cutting torch. A jet cutter includes a circular shaped explosive charge that severs the tubular radially. A chemical cutter includes a chemical (e.g., Bromine Triflouride) that is forced through a catalyst sub containing oil/steel wool mixture. The chemical reacts with the oil and ignites the steel wool, thereby increasing the pressure in the tool 700. The increased pressure then pushes the activated chemical through one or more radially displaced orifices which directs the activated chemical toward the inner diameter of the tubular to sever the tubular.

Figure 9:
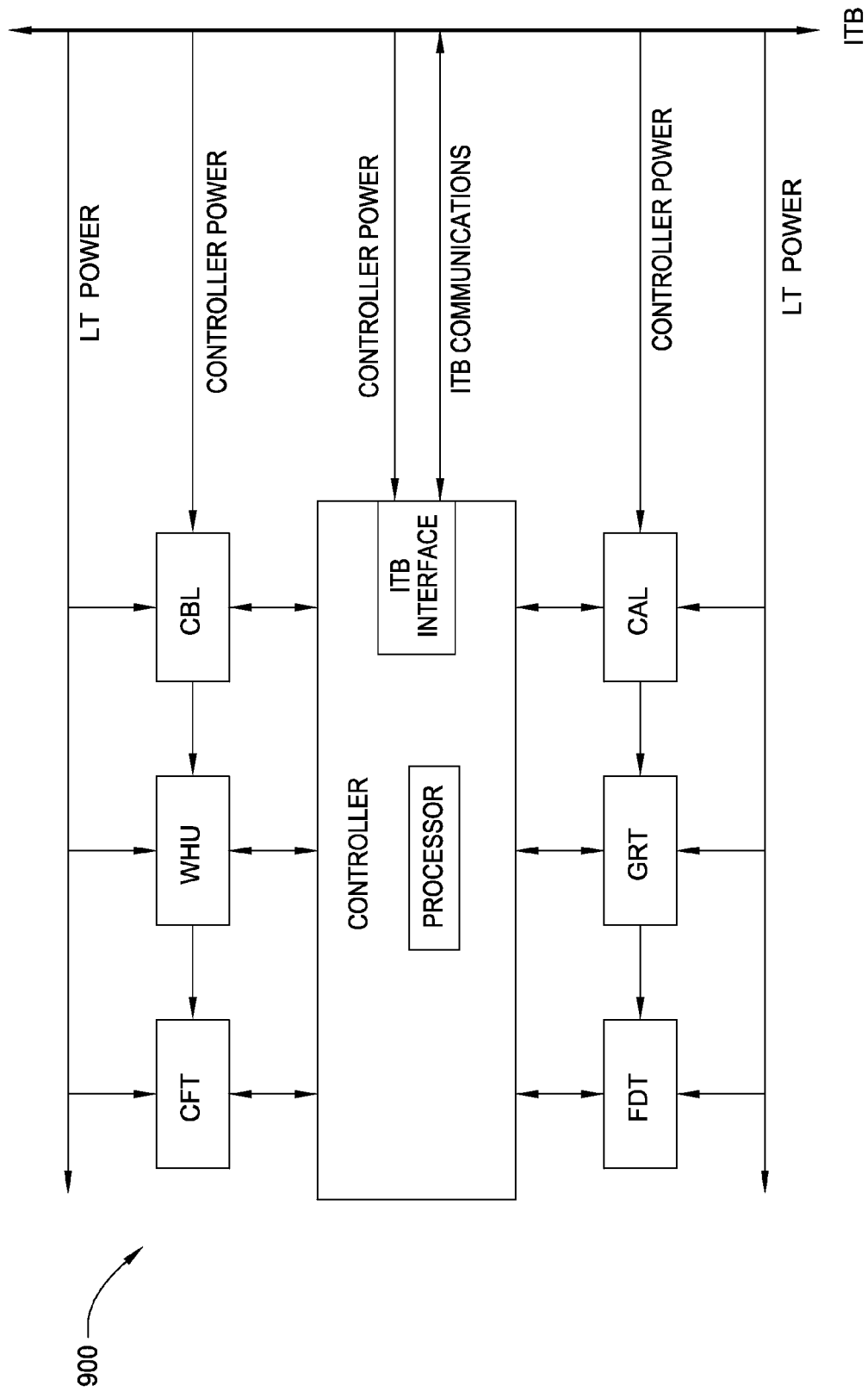
FIG. 9 is a schematic of a logging tools (LT) module.

FIG. 9 is a schematic of a logging tool (LT) module 900. The LT module may include one or more of a cased hole flowmeter (CFT), a water holdup sensor (WHU), a cement bond log (CBL), a fluid density tool (FDT), a gamma ray tool (GRT), and a caliper (CAL). Other logging tools not shown which may be included are array induction, photodensity, neutron porosity, compensated sonic, high-resolution shallow resistivity, dual laterolog, microlog/microlaterolog, hydraulic tension/compression, and ultrasonic gas detector. The logging tools module may also include a controller. The controller may include a processor and an ITB interface. The controller may in data communication with each of the logging tools. The controller may relay data from each of the logging tools to the external memory in the controller module. Each of the logging tools may receive LT power from the ITB. Additionally, each of the logging tools may have an individual controller and receive controller power from the ITB. Alternatively, each of the logging tools may be a separate module, each having their own controller.

Figure 10:
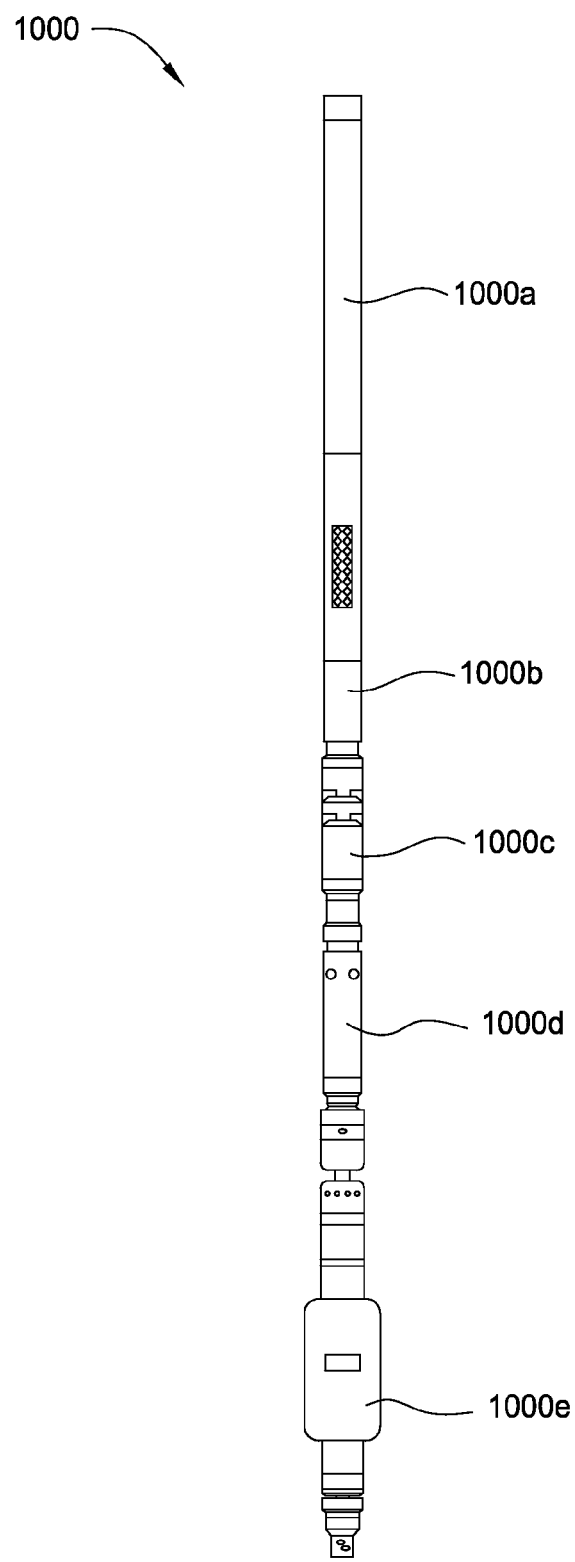
FIG. 10 illustrates another wireline tool string that may be deployed using the interface, according to an alternative embodiment of the present invention.
Figure 10D:
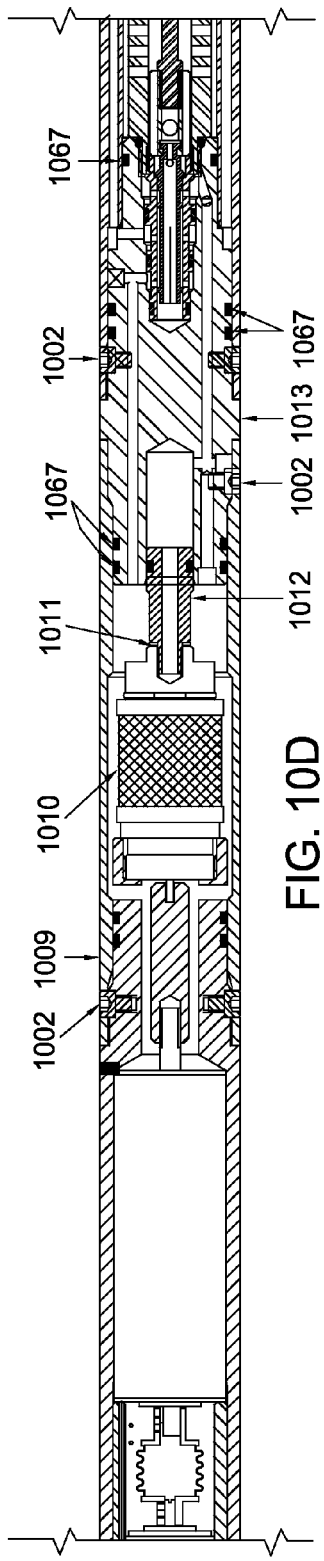
Figure 10E:
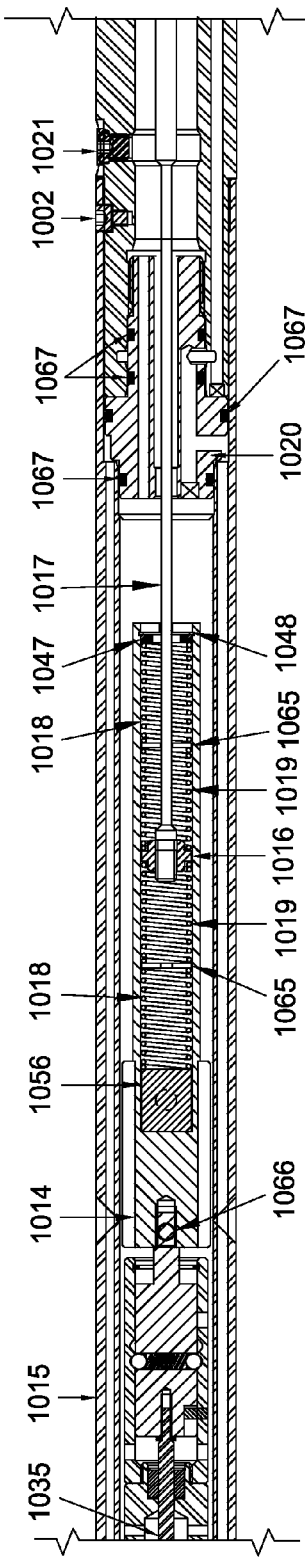
Figure 10F:
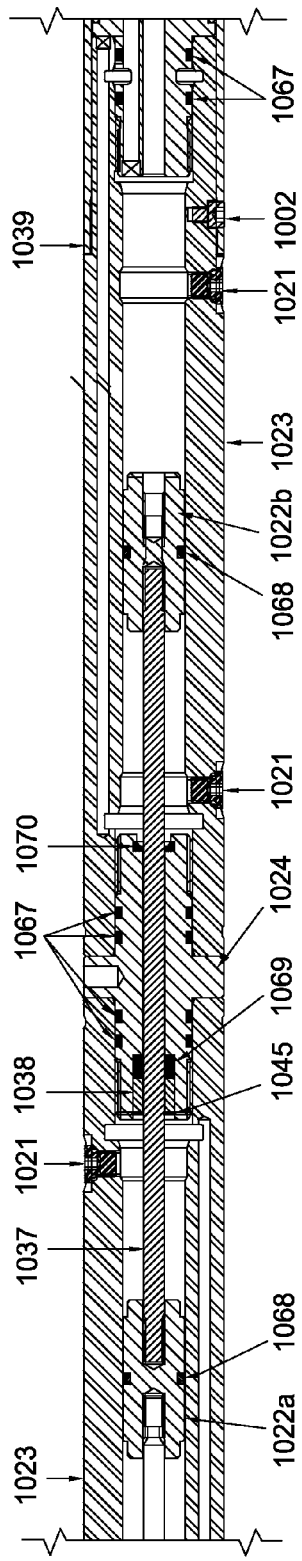
Figure 10J:
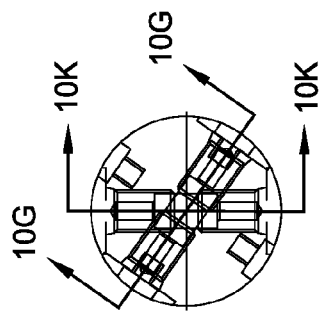
Figure 10K:
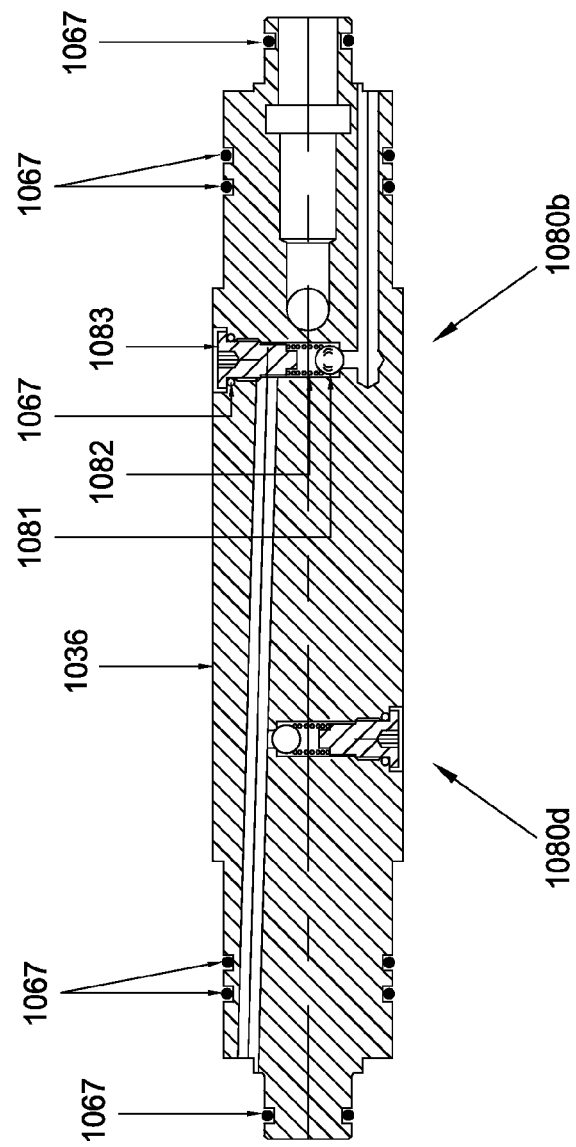

FIG. 10 illustrates another wireline tool string 1000 that may be deployed using the interface 200, according to an alternative embodiment of the present invention. The tool string 1000 may include an inflation tool 1000a, an adapter 1000b, a check or one-way valve 1000c, a deflation tool 1000d, and an inflatable plug 1000e. The inflation tool 1000a may connect the string 1000 to the adaptor 206 of the interface 200 with a coax connection to provide electrical and mechanical connectivity. The adapter 1000b may be used to couple the inflation tool 1000a to the one-way valve 1000c. Additionally, the adapter 1000b may be a cross-over having a fluid passage for fluid communication between the inflation tool 1000a and the inflatable plug 1000e.

The inflation tool 1000a may be a single or multi-stage downhole pump capable of drawing in wellbore fluid, filtering the fluids, and injecting the filtered fluids into the inflatable plug 1000e. The inflation tool may be a positive displacement pump, such as a reciprocating piston, or a turbomachine, such as a centrifugal, axial flow, or mixed flow pump. The inflation tool 1000a may be operated via electricity supplied by the FP power supply.

FIGS. 10A-10K illustrate an inflation tool 1000a suitable for use with the tool string 1000. The inflation tool 1000a may include a crossover 1001, a plurality of screws 1002, a pressure balanced chamber housing 1003, a conductor tube 1004, a pressure balance piston 1005, a fill port sub 1006, a controller housing 1007, a spring 1008, a pump housing 1009, a working fluid pump 1010, a pump washer 1011, a pump adaptor 1012, a control valve bulkhead 1013, a spring coupler 1014, a detent housing 1015, a disc 1016, a control rod 1017, a plurality of heavy springs 1018, a plurality of light springs 1019, a top bulkhead 1020, a plurality of plugs 1021, a drive piston 1022a, a pump piston 1022b, a plurality of ported hydraulic cylinders 1023, a middle bulkhead 1024, a bottom bulkhead 1026, a controller 1027, an electric motor 1028, a filter support ring 1029, a vent tube 1030, a filter support tube 1031, a filter housing 1032, a vent crossover 1033, a plurality of shear screws 1034, a directional valve 1035, a check valve assembly 1036, a drive shaft 1037, a bushing seal 1038, a cylinder housing 1039, a ground wire assembly 1041, a lead wire assembly 1042, a spring 1043, an output tube 1044, a retaining ring 1045, a plurality of set screws 1046, a spring bushing 1047, a ring 1048, a vent housing 1049, a vent extension 1050, a vent piston 1051, a socket sub 1052, a spring 1053, a filter 1054, a spacer 1056, a crossover 1057, a ball 1060, a spring 1061, a nozzle 1062, a washer 1065, a set screw 1066, a plurality of O-rings 1067, a T-seal 1068, a seal stack 1069, and a wiper 1070. The check valve assembly 1036 may include a plurality of check valves 1080a-d. Each check valve may include a check ball 1081, a spring 1082, and a plug 1083.

As shown, the inflation tool 1000a may be an electrohydraulic pump. The middle bulkhead 1024 fluidly isolates a working fluid portion of the pump 1000a from a wellbore fluid portion of the pump. The working fluid portion is filled prior to insertion of the pump 1000a in the wellbore 15. The working fluid may be a clean liquid, such as oil. The working fluid portion of the pump is a closed system. The electric motor 1028 receives electricity from the FP power supply and drives the working fluid pump 1010. The working fluid pump 1010 pressurizes the working fluid which drives the drive piston 1022a. The drive piston 1022a is reciprocated by the directional valve 1035 alternately providing fluid communication between each longitudinal end of the drive piston 1022a and the pressurized working fluid. The drive piston 1022a is longitudinally coupled to the pump piston 1022b.

The check valve assembly 1036 includes the inlet check valve 1080a, b and the outlet check valve 1080c, d for each longitudinal end of the pump piston 1022b. The inlet check valves are in fluid communication with an outlet of the filter 1054. Wellbore fluid is drawn in through one or more inlet ports (see FIG. 10) of the filter 1054. Solid particulates are filtered from the wellbore fluid as it passes through the filter. Filtered wellbore fluid is output from the filter to the inlet check valves. Pressurized filtered wellbore fluid is driven from the pump piston to the outlet check valves. The outlet check valves are in fluid communication with the vent tube 1030. Pressurized filtered wellbore fluid travels through the vent tube 1030 and the vent extension 1050 to the crossover 1057. The pressurized filtered wellbore fluid continues through the string 1000 until it reaches the plug 1000e.

The pressure balance piston 1005 maintains a working fluid reservoir at wellbore pressure. The pump 1000a may also be temperature compensated. The vent piston 1051 allows for the pump 1000a to operate in a closed system or in cross-flow.

A suitable one-way valve 1000c is illustrated in FIG. 4 of U.S. patent application Ser. No. 12/030,154 (Atty. Dock. No. WEAT/0807), filed Feb. 12, 2008, which is hereby incorporated by reference in its entirety. The one-way valve 1000c is operable to maintain inflation of the inflatable plug 1000e. In this respect one-way valve 1000c allows fluid to be pumped from the inflation tool 1000a toward the inflatable plug 1000e for inflation thereof, while preventing backflow of the pumped fluid from the inflatable plug 1000e. The one-way valve 1000c includes one or more valve elements, such as flappers. Alternatively, a ball biased to engage a seat may be used instead of the flapper. Each flapper is biased toward a closed position by a respective spring. Each flapper is pivoted to a housing by a respective pin. The housing may include one or more tubulars. Each of the tubulars may be connected by threaded connections. The dual valve elements provide for redundancy in the event one of failure of one of the valve elements. Alternatively, the one-way valve may be integrated with the outlet of the inflation tool 1000a, thereby eliminating the need of a separate valve sub connection. If the inflation tool 1000a includes an integral check valve, then the one-way valve 1000c may be omitted.

A suitable deflation tool, such as a pickup-unloader 1000d, is illustrated in FIG. 5 of the '154 application. When operated by applying a tensile force to the slickline 150 (picking up), the deflation tool 1000d relieves the fluid in the inflatable plug 1000e. Application of compression force (slacking off) will close the deflation tool 1000d. The deflation tool 1000d includes a tubular mandrel having a longitudinal flow bore therethrough. A top sub is connected to the mandrel and a seal, such as an O-ring, isolates the connection. The top sub connects to the check valve 1000c. A tubular case assembly including an upper case, a nipple, and a lower case is disposed around the mandrel and longitudinally movable relative thereto. Seals, such as o-rings or other suitable seals, isolate the case assembly connections. A biasing member, such as a spring, is disposed between a ring which abuts a nut longitudinally coupled to the mandrel and a longitudinal end of the nipple. The ring may also be secured with one or more set screws. The spring biases the deflation tool toward a closed position.

In the closed position, one or more ports, such as slots, formed through the upper case are isolated from one or more ports, such as slots, formed through the mandrel. A nozzle may be disposed in each of the upper case ports. Seals, such as o-rings, isolate the upper case ports from an exterior of the deflation tool and from the mandrel ports. When operated to an open position, a tensile force exerted on the slickline 150 pulls the mandrel flow ports into alignment with the upper case ports while overcoming the biasing the force of the spring until a shoulder of the mandrel engages a shoulder of the upper case. This allows the pressurized fluid stored in the inflated plug 1000e to be discharged into the wellbore, thereby deflating the plug. Slacking off of the wireline allows the spring to return the mandrel to the closed position where the mandrel shoulder engages a longitudinal end of the nipple.

Figure 10L:
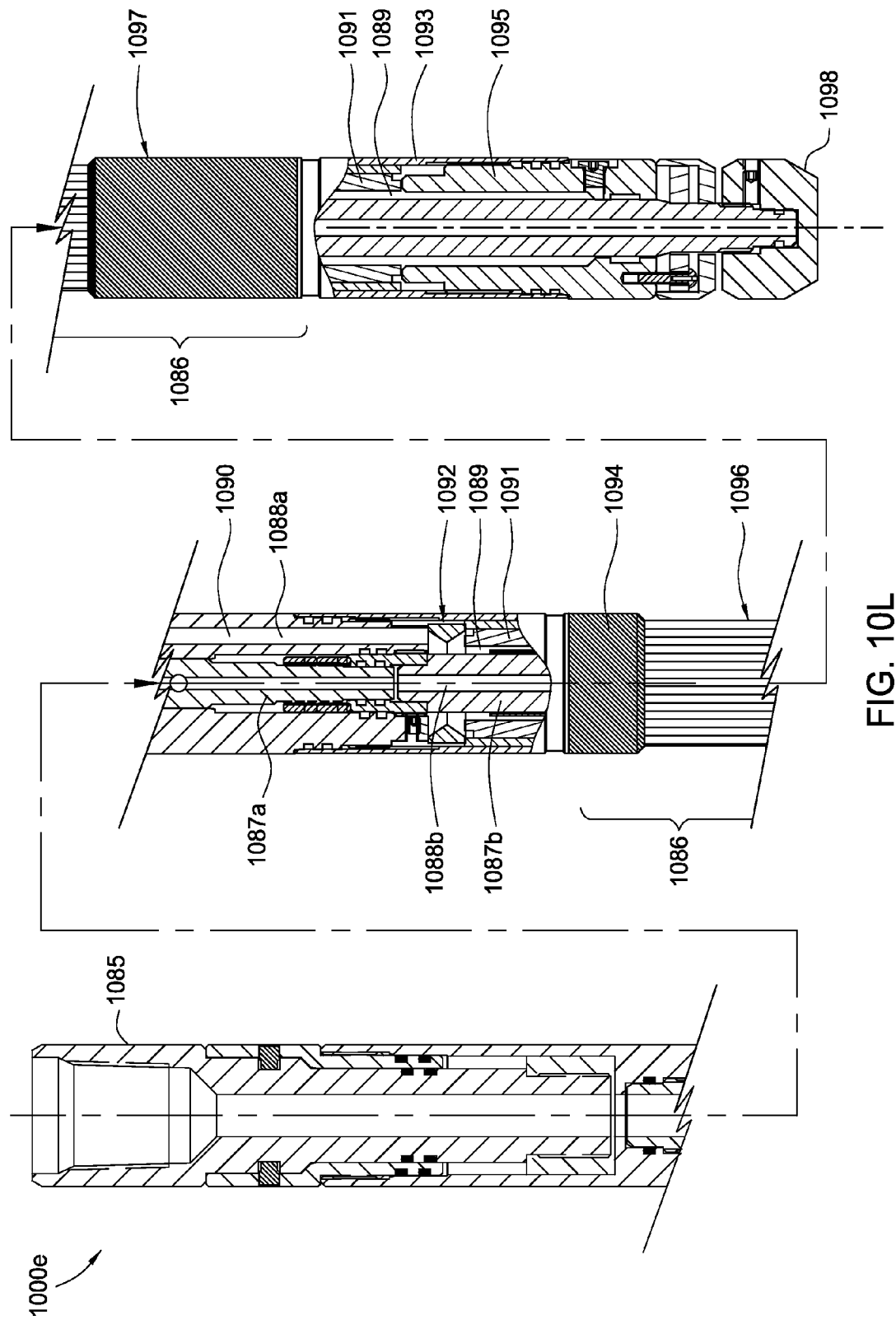
FIG. 10L is a partial section of a plug suitable for use with the tool string 1000.
Figure 10M:
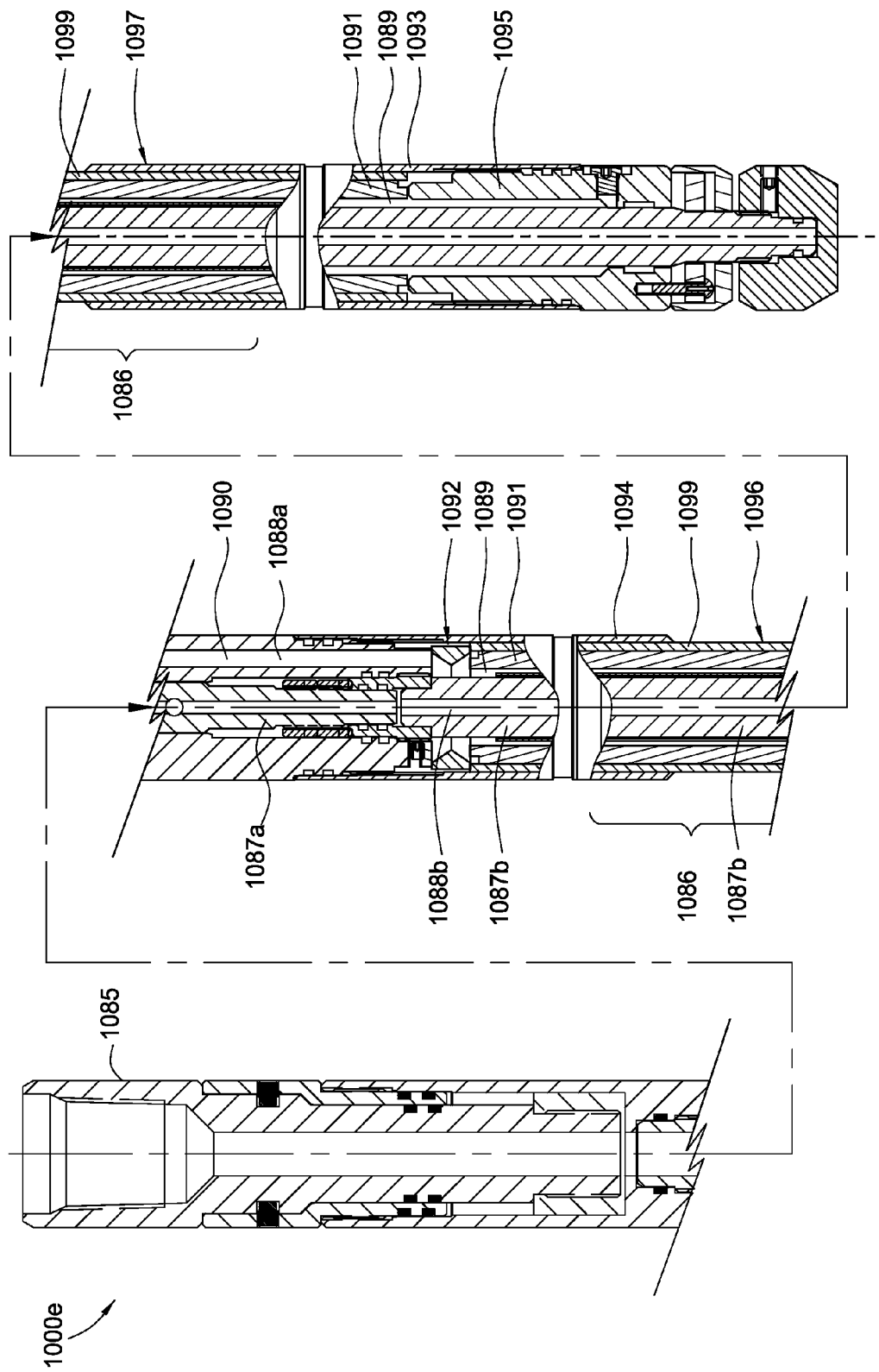
FIG. 10M is a cross section of the plug.

FIG. 10L is a partial section of a plug 1000e suitable for use with the tool string 1000. FIG. 10M is a cross section of the plug 1000e. The plug 1000e includes a packing element 1086. The packing element 1086 may be inflated using wellbore fluids, or transported inflation fluids, via the inflation tool 1000a. When the packing element 1086 is filled with fluids, it expands and conforms to a shape and size of the casing.

The plug 1000e may include a crossover housing, a crossover mandrel 1087a and a plug mandrel 1087b. A bore 1090 is formed through a wall of the crossover housing. The crossover mandrel 1087a defines a tubular body having a bore 1088a formed therethrough. The plug mandrel 1087b defines a tubular body which runs the length of the packing element 1086. A bore 1088b is defined within the plug mandrel 1087b. An annulus 1089 is defined between the outer surface of the plug mandrel 1087b and the surrounding packing element 1086. The annular region 1089 of the packing element 1086 receives fluid from the bore 1090 when the packing element 1086 is actuated. This serves as the mechanism for expanding the packing element 1086 into a set position within the casing. To expand the packing element 1086, fluid is injected by the inflation tool 1000a, through bore of a top sub 1085, through the bore of the crossover mandrel 1087a, through a port formed through a wall of the crossover mandrel, through the bore 1090, and into the annulus 1089 of the packing element 1086. Fluid continues to flow downward through the plug 1000e until it is blocked at a lower end by a nose 1098.

The packing element 1086 includes an elongated bladder 1091. The bladder 1091 is disposed circumferentially around the plug mandrel 1087b. The bladder 1091 may be fabricated from a pliable material, such as a polymer, such as an elastomer. The bladder 1091 is connected at opposite ends to end connectors 1092 and 1093. The upper end connector 1092 may be a fixed ring, meaning that the upper end of the packing element 1086 is stationary with respect to the plug mandrel 1087b. The lower end connector 1093 is connected to a slidable sub 1095. The slidable sub 1095, in turn, is movable along the plug mandrel 1087b. This permits the bladder 1091 and other packing element parts to freely expand outwardly in response to the injection of fluid into the annulus 1089 between the plug mandrel 1087b and the bladder 1091. Movement of the lower end connector 1093 upward along the plug mandrel 1087b allows the packing element 1086 to be inflated.

The packing element 1086 may further include an anchor portion 1096. Alternatively, an anchor may be formed as a separate component. The anchor portion 1096 may be fabricated from a series of reinforcing straps 1099 that are disposed around the bladder 1091. The straps 1099 may be longitudinally oriented so as to extend at least a portion of the length of or essentially the length of the packing element 1086. At the same time, the straps 1099 are placed circumferentially around the bladder 1091 in a tightly overlapping fashion. The straps 1099 may be fabricated from a metal or alloy. Alternatively, other materials suitable for engaging the casing may be used, such as ceramic or hardened composite. The straps 1099 may be arranged to substantially overlap one another in an array. A sufficient number of straps 1099 are used for the anchor portion 1096 to retain the bladder 1091 therein as the anchor portion 1096 expands.

The metal straps 1099 are connected at opposite first and second ends. The strap ends may be connected by welding. The ends of the straps 1099 are welded (or otherwise connected) to the upper 1092 and lower 1093 end connectors, respectively. The anchor portion 1096 is not defined by the entire length of the straps 1099; rather, the anchor portion 1096 represents only that portion of the straps 1099 intermediate the end connectors 1092, 1093 that is exposed, and can directly engage the surrounding casing. In this respect, a length of the straps 1099 may be covered by a sealing cover 1097.

The sealing cover 1097 is placed over the bladder 1091. The cover 1097 is also placed over a selected length of the metal straps 1099 at one end. Where a cover ring 1094 is employed, the sealing cover 1097 is placed over the straps 1099 at the end opposite the cover ring 1094. The sealing cover 1097 provides a fluid seal when the packing element 1086 is expanded into contact with the surrounding casing. The sealing cover 1097 may be fabricated from a pliable material, such as a polymer, such as an elastomer, such as a blended nitrile base or a fluoroelastomer. An inner surface of the cover 1097 may be bonded to the adjacent straps 1099.

The sealing cover 1097 for the packing element 1086 may be uniform in thickness, both circumferentially and longitudinally. Alternatively, the sealing cover 1097 may have a non-uniform thickness. For example, the thickness of the sealing cover 1097 may be tapered so as to gradually increase in thickness as the cover 1097 approaches the anchor portion 1096. In one aspect, the taper is cut along a constant angle, such as three degrees. In another aspect, the thickness of the cover 1097 is variable in accordance with an undulating design. The variable thickness cover reduces the likelihood of folding within the bladder 1091 during expansion. This is because the variable thickness allows some sections of the cover 1097 to expand faster than other sections, causing the overall exterior of the element 1086 to expand in unison.

The cover ring 1094 is optionally disposed at one end of the anchor portion 1096. The cover ring 1094 may be made from a pliable material, such as a polymer, such as an elastomer. The cover ring 1094 serves to retain the welded metal straps 1099 at one end of the anchor portion 1096. The cover ring 1094 typically does not serve a sealing function with the surrounding casing. The length of the cover ring may be less than the outer diameter of the packing element's running diameter.

As the bladder 1091 is expanded, the exposed portion of straps 1099 that define the anchor portion 1096 frictionally engages the surrounding casing. Likewise, expansion of the bladder 1091 also expands the sealing cover portion 1097 into engagement with the surrounding casing. The plug 1000a is thus both frictionally and sealingly set within the casing. The minimum length of the anchor portion 1096 may be defined by a mathematical formula. The anchor length may be based upon the formula of two point six three multiplied by the inside diameter of the casing. The maximum length of the expanded anchor portion 1096 may be less than fifty percent of the overall length of the packing element 1086 upon expansion. In this regard, the anchor portion 1096 does not extend beyond the center of the packing element 1086 after the packing element is expanded.

The tool string 1000 may be used to isolate and flow test multiple zones of a hydrocarbon bearing formation. The test may include a pressure buildup and/or a pressure drawdown test. For example, the tool string 1000 may be used to test three perforated zones. Initially, production from all three zones may be measured to determine the total flow. The tool string 1000 and the interface 200 may then be deployed into the wellbore such that the inflatable plug 1000e is positioned between the first zone and the second zone, thereby isolating the first zone from the second and third zones.

Once the main controller detects the trigger event, the main controller instructs the FP power supply to operate the pump 1000a, thereby expanding the inflatable plug 1000e. The current draw of the inflation tool 1000a may be monitored by the main controller via the power switch and monitor to determine the extent of inflation. For example, the current draw may be proportional to the pressure in the inflatable plug 1000a. The inflatable plug 1000e is inflated until a predetermined pressure is reached. The inflation pressure is maintained by the one-way valve 1000c. Actuation of the inflatable plug 1000e isolates the first zone from the other two zones. In this respect, only the flow from the second and third zones is collected.

After flow of the second and third zones has occurred for a predetermined time, the inflatable plug 1000e is deflated and moved to another location. To deflate the plug 1000e, the slickline 150 is picked up to apply a tension force to the deflation tool 1000c, in this case, the pickup unloader. The tension force causes the pickup unloader 1000c to open, thereby allowing deflation of the plug 1000e.

After deflation, the plug 1000e is moved to a location between the second zone and the third zone. The main controller may wait for a predetermined period of time or monitor for another trigger event. The process of actuating the plug 1000e is repeated to isolate the third zone from the remaining two zones. In this respect, only flow from the third zone is collected. After the test is run, the plug 1000e may be deflated in a manner described above. From the flow data collected from the two tests and the total flow of all three zones, the flow of each zone may be calculated. In this manner, flow testing of multiple zones may be performed in one trip.

The tool string 1000 may also include an instrumentation sub (not shown). The instrumentation sub may include sensors to monitor condition of the tool string 1000. For example, the instrumentation sub may include pressure and temperature sensors in communication with the inflation fluid path for monitoring performance of the inflation tool 1000a and/or the plug 1000e. Additionally, the instrumentation sub may include a sensor for determining whether the plug has set properly (i.e., by monitoring position of the slidable sub 1095). The tool string 1000 may further include a second instrumentation sub disposed below the plug 1000e so that it may measure the effect of testing one or more zones on the isolated zone(s). The instrumentation sub may be in data communication with the main controller.

Figure 11:
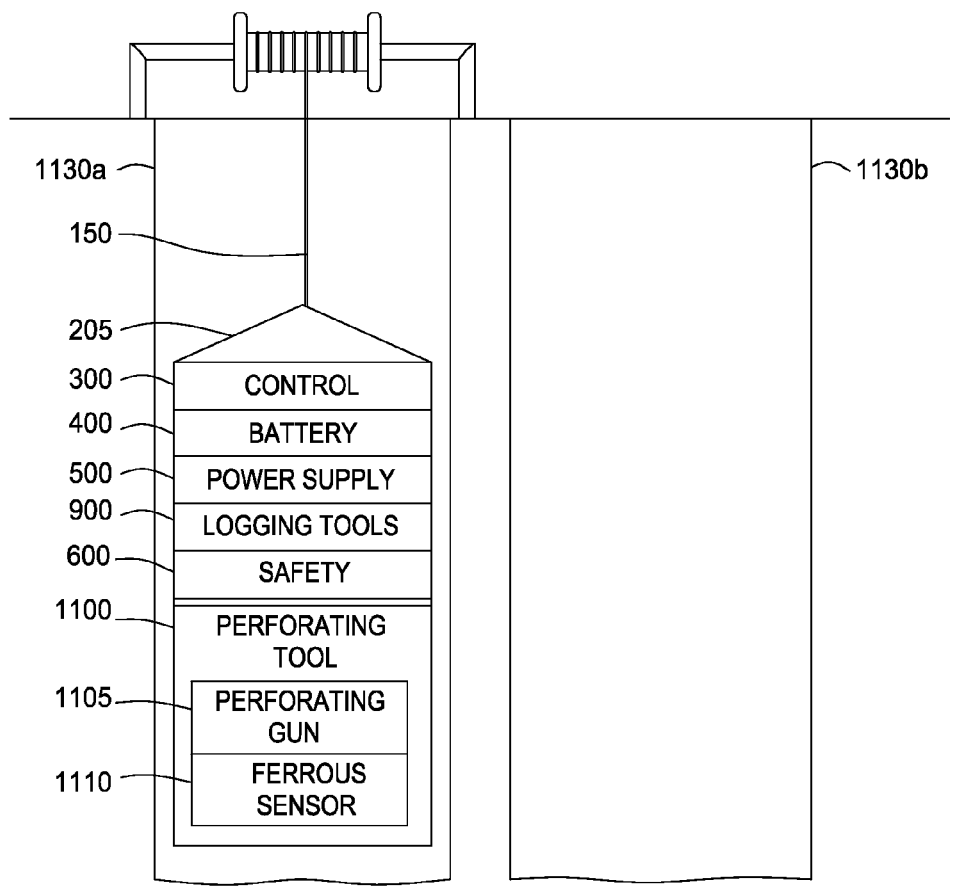
FIGS. 11 and 11A illustrate a side view and a top view, respectively, of another wireline tool, such as a perforating tool, that may be deployed using the interface, according to an alternative embodiment of the present invention.
Figure 11A:
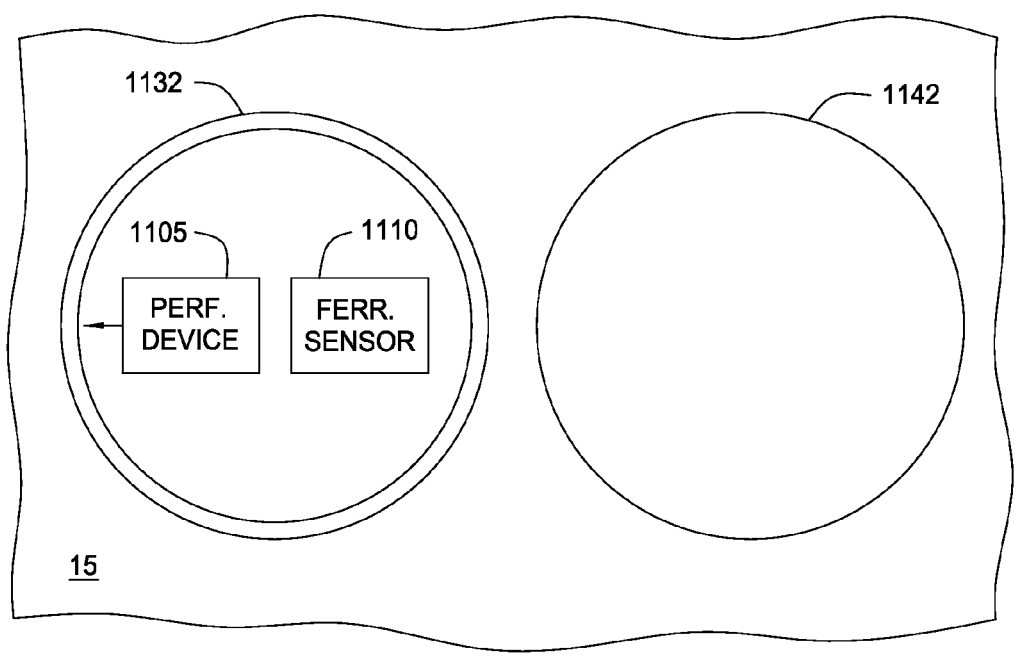

FIGS. 11 and 11A illustrate a side view and a top view, respectively, of another wireline tool, such as a perforating tool 1100 that may be deployed using the interface 200, according to an alternative embodiment of the present invention. The perforating tool 100 may include a perforating gun 1105, a ferrous sensor 1110, an anchor (not shown), and an electric motor (not shown). For example, the perforating tool 1100 may be anchored by the inflation tool 1000, one of the anchor assemblies 210a,b, or the frac-plug 1225.

The ferrous sensor 1110 detects a location of the adjacent pipe 1130b so as not to damage it. The ferrous sensor 1110 may be located to generate a signal when a perforating gun 1105 is pointing in an opposite direction of the adjacent pipe 130b. The main controller may generate a signal to rotate the perforating gun 1105 while monitoring the signal generated by the ferrous sensor to determine a direction of the perforating gun 1105 with respect to the adjacent pipe 1130b. The main controller may then generate a signal to fire the perforating gun 1105 in response to determining the perforating gun 1105 is pointing away from the adjacent pipe 1142.

In operation, the interface 200 and the perforating tool 1100 are lowered into the wellbore 15. The main controller detects the trigger event. The main controller instructs the FP power supply to generate a signal to rotate the perforating tool 1118 while monitoring the signal generated by the ferrous sensor 1124. The main controller may then instruct the FP power supply to generate a firing signal to fire the perforating gun 1110 in response to determining the perforating gun 1105 is pointing away from the adjacent pipe 1130b.

Figure 12:
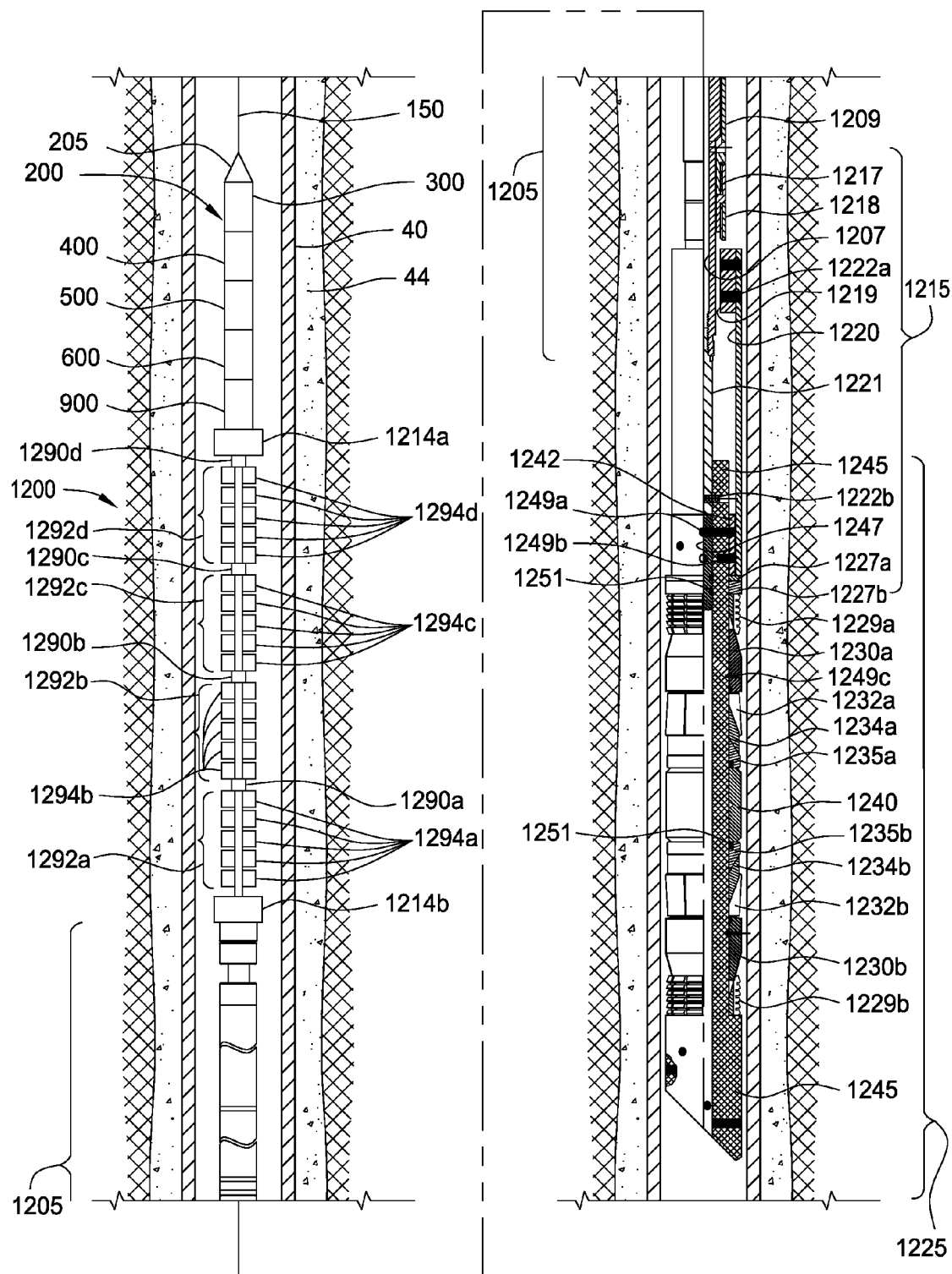
FIG. 12 illustrates another wireline tool, such as tool string 1200, that may be deployed using the interface 200, according to an alternative embodiment of the present invention.

FIG. 12 illustrates another wireline tool, such as tool string 1200, that may be deployed using the interface 200, according to an alternative embodiment of the present invention. The tool string 1200 may include one or more perforation guns 1292a-d, a setting tool 1205, an adapter kit 1215, and a frac plug 1225. Each perforation gun 1292a-d includes one or more perforation charges 1294a-d and is independently fired using a select-fire firing head 1290a-d.

The frac-plug 1225 may include a mandrel 1245, first and second slips 1229a,b, first and second slip cones 1230a,b, a packing element 1240, first and second element cones 1235a,b, first and second expansion rings 1234a,b, and first and second expansion support rings 1232a,b. The frac-plug assembly 1225 may be made from a drillable material, such as a non-steel material. The mandrel 1245 and the cones 1230a,b and 1235a,b may be made from a fiber reinforced composite. The composite material may be constructed of a polymer that is reinforced by a continuous fiber such as glass, carbon, or aramid, for example. The polymer may be an epoxy blend, polyurethanes, or phenolics. The slips 1229a,b may be made from a non-steel metal or alloy, such as cast iron. The packing element 1240 may be made from a polymer, such as an elastomer.

The packing element 1240 is backed by the element cones 1235a,b. An o-ring 1251 (with an optional back-up ring) may be provided at the interface between each of the expansion cones and the packing element 1240. The expansion rings 1234a,b are disposed about the mandrel 1245 between the element cones 1235a,b, and the expansion support rings 1232a,b. The expansion support rings 1232a,b are each an annular member having a first section of a first diameter that steps up to a second section of a second diameter. An interface or shoulder is therefore formed between the two sections. Equally spaced longitudinal cuts are fabricated in the second section to create one or more fingers or wedges there-between. The number of cuts is determined by the size of the annulus to be sealed and the forces exerted on each expansion support ring 1232a,b.

The wedges are angled outwardly from a center line or axis of each expansion support ring 1232a,b at about 10 degrees to about 30 degrees. The angled wedges hinge radially outward as each expansion support ring 1232a,b moves longitudinally across the outer surface of each respective expansion ring 1234a,b. The wedges then break or separate from the first section, and are extended radially to contact an inner diameter of the surrounding casing 55b. This radial extension allows the entire outer surface area of the wedges to contact the inner wall of the casing 55b. Therefore, a greater amount of frictional force is generated against the surrounding tubular. The extended wedges thus generate a "brake" that prevents slippage of the frac plug assembly 1225 relative to the casing 40.

The expansion rings 1234a,b may be manufactured from a polymer, such as polytetrafluoroethylene (PTFE). The second section of each expansion support ring 1232a,b is disposed about a first section of the respective expansion ring 1234a,b. The first section of each expansion ring 1234a,b is tapered corresponding to a complimentary angle of the wedges. A second section of each expansion ring 1234a,b is also tapered to compliment a sloped surface of each respective element cone 1235a,b. At high temperatures, the expansion rings 1234a,b expand radially outward from the mandrel 1245 and flow across the outer surface of the mandrel 1245. The expansion rings 1234a,b fill the voids created between the cuts of the expansion support rings 1232a,b, thereby providing an effective seal.

The element cones 1235a,b are each an annular member disposed about the mandrel 1245 adjacent each end of the packing element 1240. Each of the element cones 1235a,b has a tapered first section and a substantially flat second section. The second section of each element cone 1235a,b abuts the substantially flat end of the packing element 1240. Each tapered first section urges each respective expansion ring 1234a,b radially outward from the mandrel 1245 as the frac plug assembly 1225 is set. As each expansion ring 1234a,b progresses across each respective tapered first section and expands under high temperature and/or pressure conditions, each expansion ring 1234a,b creates a collapse load on a respective element cone 1235a,b. This collapse load holds each of the element cones 1235a,b firmly against the mandrel 1245 and prevents longitudinal slippage of the frac plug assembly 1225 once the frac plug assembly 1225 has been set in the wellbore. The collapse load also prevents the element cones 1235a,b and packing element 1240 from rotating during a subsequent mill/drill through operation.

The packing element 1240 may have any number of configurations to effectively seal an annulus within the wellbore. For example, the packing element 1240 may include grooves, ridges, indentations, or protrusions designed to allow the packing element 1240 to conform to variations in the shape of the interior of a surrounding tubular (not shown). The packing element 1240, may be capable of withstanding high temperatures, i.e., four hundred fifty degrees Fahrenheit, and high pressure differentials, i.e., fifteen thousand psi.

The mandrel 1245 is a tubular member having a central longitudinal bore therethrough. A plug 1247 may be disposed in the bore of the mandrel 1245. The plug 1247 is a rod shaped member and includes one or more O-rings 251 each disposed in a groove formed in an outer surface of the plug 1247. A back-up ring may also be disposed in each of the plug grooves. Alternatively, the mandrel 1245 may be solid. The slips 1229a,b are each disposed about the mandrel 1245 adjacent a first end of each respective slip cone 1230a,b. Each slip 1229a,b includes a tapered inner surface conforming to the first end of each respective slip cone 1230a,b. An outer surface of each slip 1229a,b, may include at least one outwardly extending serration or edged tooth to engage an inner surface of a the casing 40 when the slips 1229a,b are driven radially outward from the mandrel 1245 due to longitudinal movement across the first end of the slip cones 1230a,b.

The slips 1229a,b are each designed to fracture with radial stress. Each slip 1229a,b typically includes at least one recessed groove milled therein to fracture under stress allowing the slip 1229a,b to expand outward to engage an inner surface of the casing 40. For example, each of the slips 1229a,b may include four sloped segments separated by equally spaced recessed grooves to contact the casing 40, which become evenly distributed about the outer surface of the mandrel 1245.

Each of the slip cones 1230a,b is disposed about the mandrel 1245 adjacent a respective expansion support ring 1232a,b and is secured to the mandrel 1245 by one or more shearable members 1249c such as screws or pins. The shearable members 1249c may be fabricated from a drillable material, such as the same composite material as the mandrel 1245. Each of the slip cones 1230a,b has an undercut machined in an inner surface thereof so that the cone 1230a,b can be disposed about the first section of the respective expansion support ring 1232a,b, and butt against the shoulder of the respective expansion support ring 1232a,b. Each of the slips 1229a,b travel about the tapered first end of the respective slip cone 1230a,b, thereby expanding radially outward from the mandrel 1245 to engage the inner surface of the casing 40.

One or more setting rings 1227a,b are each disposed about the mandrel 1245 adjacent a first end of the first slip 1229a. Each of the setting rings 1227a,b is an annular member having a first end that is a substantially flat surface. The first end of the first setting ring 1227a serves as a shoulder which abuts an adapter sleeve 1220. A support ring 1242 is disposed about the mandrel 1245 adjacent the first end of the first setting ring 1227a. One or more pins 1249b secure the support ring 1242 to the mandrel 1245. The support ring 1242 is an annular member and serves to longitudinally restrain the first setting ring 1227a.

The setting tool 1205 includes a mandrel 1207 and a setting sleeve 1209 which is longitudinally movable relative to the mandrel 1207. The mandrel 1207 is longitudinally coupled to the slickline 150 via the perforating gun assembly 1294a-d. The setting tool may include a power charge which is ignitable via an electric signal transmitted from the interface 200. Combustion of the power charge creates high pressure gas which exerts a force on the setting sleeve 1209. Alternatively, a hydraulic pump may be used instead of the power charge.

The adapter 1215 is longitudinally disposed between the setting tool 1205 and the frac plug 1225. The adapter 1215 may include a thread-saver 1217, a thread cover 1218, an adapter rod 1221, the adapter sleeve 1220, and an adapter ring 1219. Since the thread-saver 1217, thread cover 1218, and the adapter rod 1221 will return to the surface, they may be made from a conventional material, i.e. a metal or alloy, such as steel. The adapter sleeve 1220 and the adapter ring 1219 may be made from any of the mandrel 1245 materials, discussed above. The thread-saver 1217 is longitudinally coupled to the setting sleeve 1209 with a threaded connection. The thread cover 1218 is longitudinally coupled to the thread-saver 1217 with a threaded connection. Alternatively, the thread cover 1218 and thread saver 1217 may be integrally formed.

The adapter rod 1221 is longitudinally coupled to the setting mandrel 1207 at a first longitudinal end with a threaded connection and longitudinally coupled to the mandrel 1245 at a second longitudinal end with one or more shearable members, such as a shear pin 1222b. The adapter rod 1221 also shoulders against a first longitudinal end of the mandrel 1245 near the second longitudinal end of the adapter rod 1221. The second longitudinal end of the adapter rod 1221 abuts a first longitudinal end of the plug 1247. The adapter ring 1219 is longitudinally coupled to the adapter sleeve 1220 at a first longitudinal end of the adapter sleeve 1220 with one or more pins 1222a. The adapter ring 1219 is configured so that the thread cover 1218 will abut a first longitudinal end of the adapter ring 1219 when the setting tool 1205 is actuated, thereby transferring longitudinal force from the setting tool 1205 to the adapter ring 1219. A second longitudinal end of the adapter sleeve 1220 abuts a first longitudinal end of the first setting ring 1227a.

To set the frac-plug assembly 1225, the mandrel 1245 is held by the slickline 150, through the setting mandrel 1207 and adapter rod 1247, as a longitudinal force is applied through the setting sleeve 1209 to the adapter sleeve 1220 upon contact of the setting sleeve with the adapter sleeve. The setting force is transferred to the setting rings 1227a,b and then to the slip 1229a, and then to the first slip cone 1230a, thereby fracturing the first shear pin 1249c. The force is then transferred through the various members 1232a, 1234a, 1235a, 1240, 1235b, 1234b, and 1232b to the second slip cone 1230b, thereby fracturing the second shear pin 1249c. Alternatively, the shear pins 1249c may fracture simultaneously or in any order. The slips 1229a,b move along the tapered surface of the respective cones 1230a,b and contact an inner surface of a the casing 40. The longitudinal and radial forces applied to slips 1229a,b cause the recessed grooves to fracture into equal segments, permitting the serrations or teeth of the slips 1229a, b to firmly engage the inner surface of the casing 40.

Longitudinal movement of the slip cones 1230a,b transfers force to the expansion support rings 1232a,b. The expansion support rings 1232a,b move across the tapered first section of the expansion rings 1234a,b. As the support rings 1232a,b move longitudinally, the first section of the support rings 1232a,b expands radially from the mandrel 1245 while the wedges hinge radially toward the casing 40. At a predetermined force, the wedges break away or separate from respective first sections of the support rings 1232a,b. The wedges then extend radially outward to engage the casing 40. The expansion rings 1234a,b flow and expand as they are forced across the tapered sections of the respective element cones 1235a,b. As the expansion rings 1234a,b flow and expand, the expansion rings 1234a,b fill the gaps or voids between the wedges of the respective support rings 1232a,b.

The growth of the expansion rings 1234a,b applies a collapse load through the element cones 1235a,b on the mandrel 1245, which helps prevent slippage of the frac plug 1225, once activated. The element cones 1235a,b then longitudinally compress and radially expand the packing element 1240 to seal an annulus formed between the mandrel 1245 and an inner diameter of the casing 40.

Once the frac plug 1225 has been run-in and set at a first desired depth below a first planned perforation interval using the setting tool 1205 and adapter 1215, a tensile force is then exerted on the shear pin 1222b sufficient to fracture the shear pin 1222b. The slickline 150 may then be retracted, thereby separating the tool string 1200 from the frac plug 1225, adapter sleeve 1220, and adapter ring 1219. Since the adapter sleeve 1220 is left with the frac plug 1225, the radial clearance of the tool string 1200 with the inner surface of the casing 40 is increased, thereby not interfering with subsequent fracturing/stimulation operations.

The tool sting 1200 is then positioned in the wellbore with perforation charges 1290a at the location of the first interval to be perforated. Positioning of the tool string 1200 is readily performed and accomplished using the casing collar locator. Then the perforation charges 1294a are fired to create the first perforation interval, thereby penetrating the casing 40 and cement sheath 44 to establish a flow path with the formation.

After perforating the formation, treatment fluid is pumped and positively forced to enter the formation via the first perforation interval and results in the creation of a hydraulic proppant fracture. Near the end of the treatment stage, a quantity of ball sealers, sufficient to seal the first perforation interval, may be injected into the wellbore. Decentralizers 1214a,b may be activated, before commencement of the treatment or before injection of the ball sealers, to move the tool string 1200 radially into contact with the inner surface of the casing 40 so as not to obstruct the treatment process. Following the injection of the ball sealers, pumping is continued until the ball sealers reach and seal the first perforation interval. With the first perforation interval sealed by ball sealers, the tool string 1200, may then be repositioned so that the perforation gun 1292b would be opposite of the second interval 150b to be treated. The perforation gun 1292b may then be fired to create the second perforation interval, thereby penetrating the casing 40 and cement sheath 44 to establish a flow path with the formation to be treated. The second interval may be then treated and the operation continued until all of the planned perforation intervals have been created and the formation(s) treated.

More discussion of operation of the tool string 1200 may be found in U.S. patent application Ser. No. 11/567,102 (Atty. Dock. No. WEAT/0766), filed Dec. 5, 2006, which is hereby incorporated by reference in its entirety.

Figure 13A:
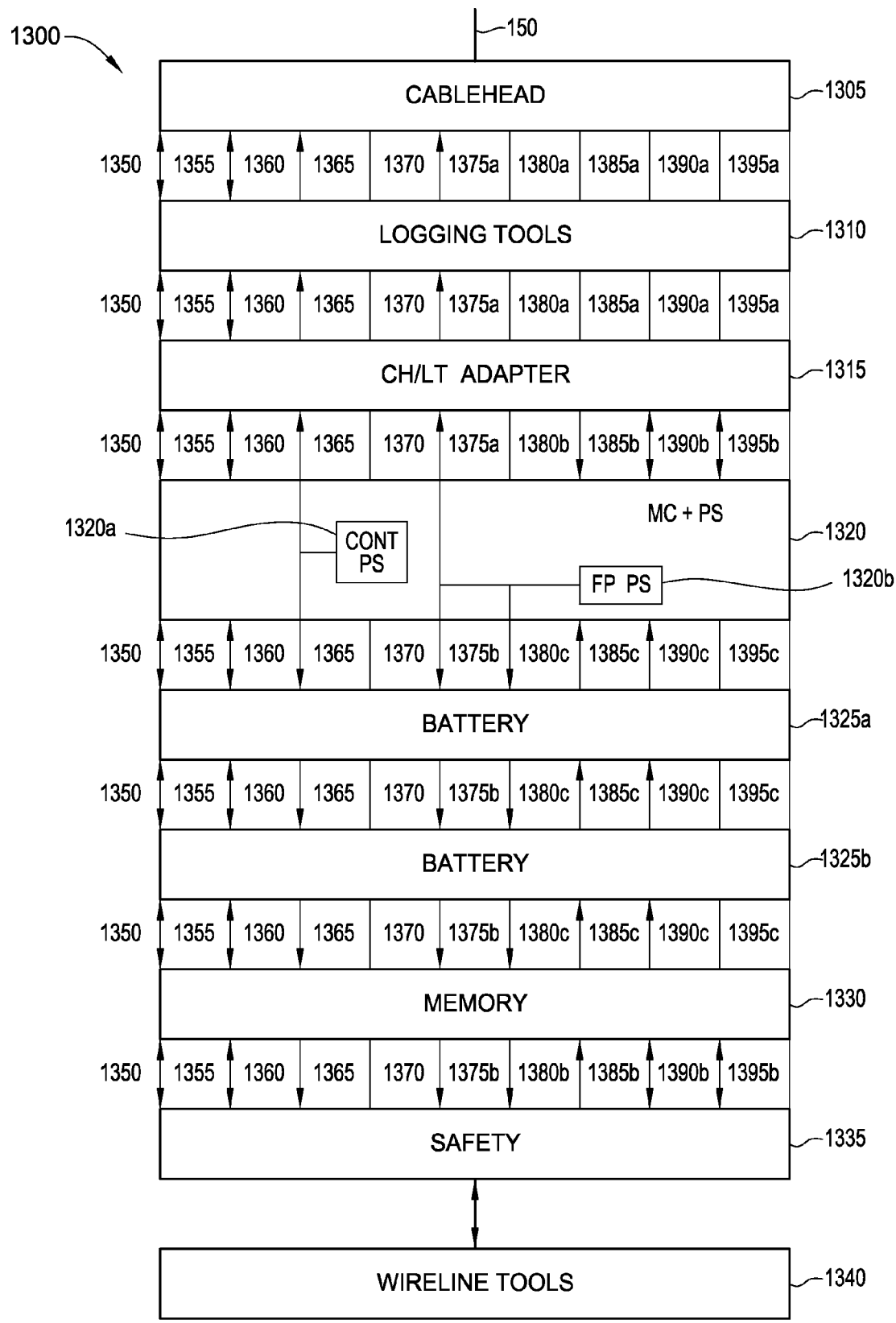

FIGS. 13A and 13B illustrate an interface 1300, according to another embodiment of the present invention. The interface may include a cablehead (CH) 1305, a logging tools module 1310, a cablehead/logging tool (CH/LT) adapter 1310, a controller/power supply (MC+FPS) module 1320, one or more battery modules 1325a, b, a memory module 1330, and a safety module 1340. As discussed above for the interface 200, a crossover 1347 (see FIGS. 14D and E) may be used instead of the safety module 1340 when non-hazardous wireline tools 1340 are being deployed with the interface 1300. The wireline tools 1340 may include one or more of any of the wireline tools 100, 700, 800, 1000-1200. As with the interface 200, the modules may be in data and electrical communication via an ITB 1350-1395. Also as with the interface 200, each of the modules may be connected using the field joint 290. The logging tools module 1310 may be identical to the logging tools module 900. The safety module 1335 may be identical to the safety module 600. The battery modules 1325 a, b may each be identical to the battery module 400. The memory module 1330 may include a memory unit, a controller, and an ITB interface.

As compared to the interface 200, the main controller and power supply modules have been combined into one module 1320. The combined MC+PS module 1320 may include the main controller, the power switch and monitor, the FP interface, the controller power supply 1320a, the FP power supply 1320b, and the FP relay. The main controller may be similar to the main controller of the interface 200 with the addition of an interface to the FP power supply so that it may perform the duties of both main controller and power supply controller of the interface 200. The main controller need not include the pressure sensor, temperature sensor, and CCL as these may be located in the cablehead 1305. The cablehead 1305 may now include a processor, an ITB interface, and interfaces for the sensors and may communicate with the main controller via the ITB. Further, to download data from the main controller, the main controller field joint 290 may be directly plugged into as the pins 1380b, 1385b, 1390b, and 1395b are USB compatible. A simple USB/field joint adapter allows for connection to a standard USB device. The memory module 1330 includes a field joint 290 with similar capability.

Also as compared to the interface 200, the MC+PS module 1320 may only include the FP power supply to alternatively power the logging tools or the wireline tools. Having only one FP power supply reduces the required size of the MC+PS module and thus the interface 1300. Further, as discussed below, at least some of the intended configurations of the interface do not include both the logging tools module and wireline tools so that two separate power supplies are not needed. For the configurations that do include both wireline tools and logging tools, it may not be necessary to power both simultaneously. Additionally, an LT power supply or a second FP power supply may be added to the MC+PS module 1320.

FIGS. 14A-E illustrate configurations 1400a-e of the interface 1300 intended for specific operations. Configurations 1400a, b are intended for gage runs. The gage run configurations 1400a, b include the cablehead 1305, the CH/LT adapter 1315, the MC+PS module 1320, one of the battery modules 1325a, and a bull plug 1345. The gage run configuration 1400b further includes a gamma ray module 1310. The internal memory of the main controller may be sufficient to store the gamma ray data or the memory module 1330 may be employed.

A gage run is usually performed before a particular service operation is carried out. For example, given a FP operation, the gage run may be conducted by lowering the configuration 1400a of the interface 1300 into the wellbore to a depth below the stuck point. The main controller detects the trigger event and activates the CCL and may also activate the pressure and/or temperature gages. The interface 1400a is raised to the surface while the main controller records the time at which each collar of the drill string is detected. The drill string may be held in a neutral position during the gage run or may be unsupported from the surface. The gage run continues until the interface reaches the surface where the data may be downloaded from the main controller (the data may be stored in the internal memory of the main controller). The data may then be correlated to surface recorded data (i.e., length of unspooled slickline 150 vs. time) to generate a collar log. The collar log may then be used to program a number of collars as the trigger event for the main controller for the subsequent service operation.

The gage run configuration 1400b allows for pattern recognition technology (PRT) to be implemented. Using a CCL to determine depth may not be as accurate as desired. Improper or inaccurate measurements of the length of the drill string may take place due to inconsistent lengths of collars and drill string/casing, pipe stretch, pipe tabulation errors, etc., resulting in erroneous location of each drill string/casing string collar. Thus, the interface 1300 and wireline tools 1340 may be positioned at the wrong depth of the wellbore based on a collar log.

To perform a PRT gage run, the interface 1300 is lowered into the wellbore to a predetermined depth. The main controller detects the trigger event and activates the gamma ray tool. The interface 1300 is then raised toward the surface, for example, at a rate of approximately 5 meters per minute, to record gamma counts as the gamma ray tool passes by differing lithologies. Once the interface reaches the surface, the gamma ray data may be downloaded from the main controller. A log is then generated by merging the recorded surface depth/time records with the downhole gamma count record. The log is then compared to a previously produced well log (e.g., open-hole gamma-ray log) and correlated to the same marker formation. As the open hole gamma-ray log is considered correct, a depth position adjustment, if necessary, is calculated based on the comparison of the gamma log to the open hole gamma-ray log. Once the log data has been analyzed, a gamma pattern may be programmed into the main controller as the trigger event for a subsequent operation. Alternatively, a neutron tool may be used instead of a gamma ray tool.

Configuration 1400c is intended for hazardous service. The hazardous service configuration 1400a, b includes the cablehead 1305, the CH/LT adapter 1315, the MC+PS module 1320, one of the battery modules 1325a, the safety module 1335, and a hazardous wireline tool 1340. The hazardous wireline tool 1340 may include the radial cutting torch 800, the perforation tool 1100, the tool string 1200, a stringshot, a jet cutter, or a chemical cutter.

Configuration 1400d is intended for pipe intervention. The pipe intervention configuration 1400d includes the cablehead 1305, the CH/LT adapter 1315, the MC+PS module 1320, the battery modules 1325a, b, the crossover 1347, and a wireline tool 1340. The wireline tool 1340 may include one or more of the FPT 100, the cutting tool 700, the tool string 1000, and the setting tool 1205 and the frac plug 1225.

Configuration 1400e is intended for logging. The logging configuration 1400e includes the cablehead 1305, one or more of the logging tools 1310, the CH/LT adapter 1315, the MC+PS module 1320, one of the battery modules 1325a, and the memory module 1330.

Another alternative embodiment of the interface is discussed in U.S. Pat. No. 6,945,330 (Atty. Dock. No. WEAT/0234), which is incorporated by reference in its entirety. Another alternative embodiment of the interface is discussed in U.S. Pat. App. Pub. No. 2005/0269106 (Atty. Dock. No. WEAT/0652.P1), which is incorporated by reference in its entirety. Another alternative embodiment of the interface is discussed in U.S. Pat. No. 6,736,210 (Atty. Dock. No. WEAT/0118), which is incorporated by reference in its entirety. Another alternative embodiment of the interface is discussed in U.S. Pat. App. Pub. No. 2005/0240351 (Atty. Dock. No. WEAT/0596), which is incorporated by reference in its entirety.

Figures 15A, 15B, 15C:
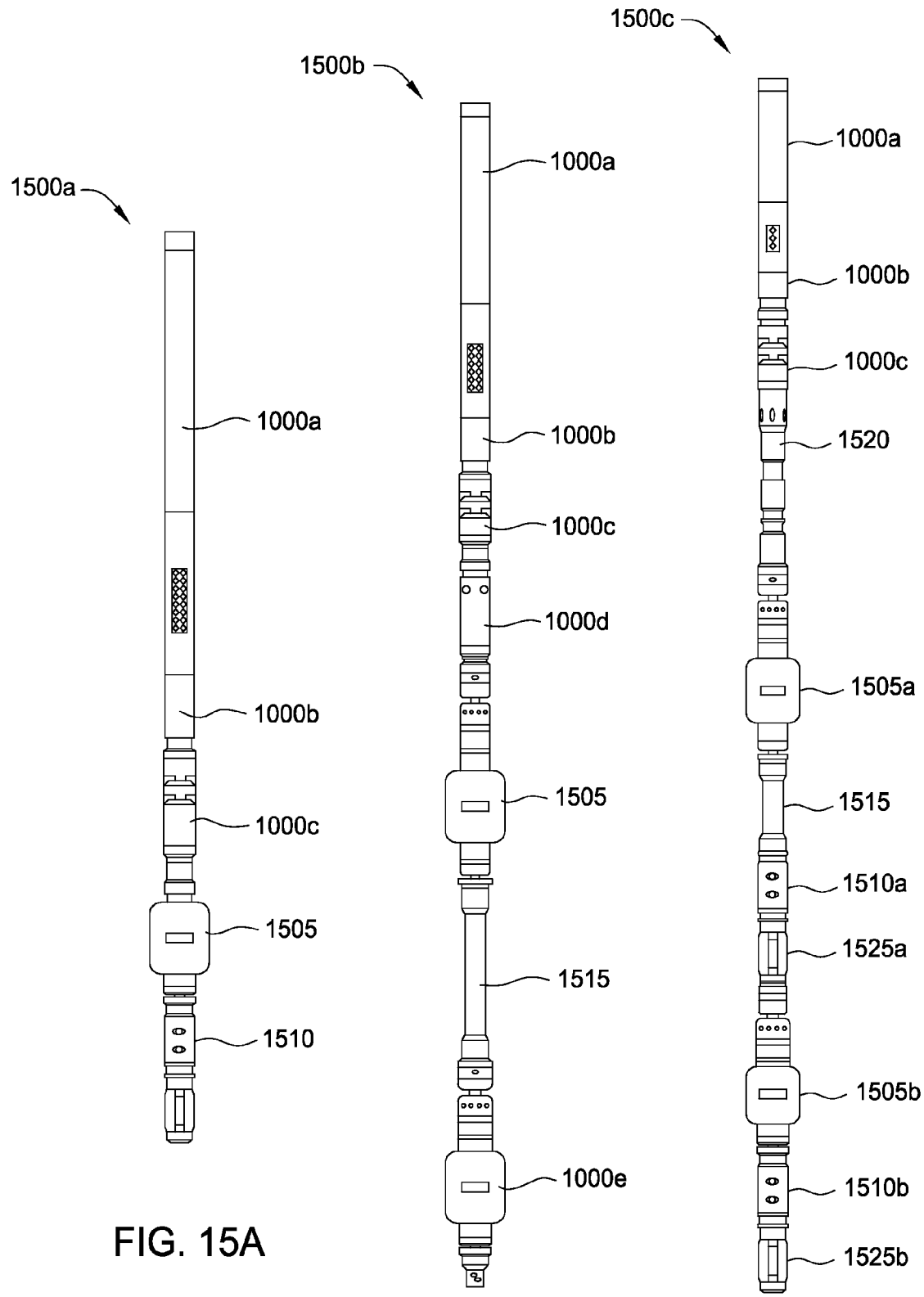
FIG. 15A illustrates another wireline tool string that may be deployed using one of the interfaces, according to an alternative embodiment of the present invention.
FIG. 15B illustrates another wireline tool string that may be deployed using one of the interfaces, according to an alternative embodiment of the present invention.
FIG. 15C illustrates another wireline tool string that may be deployed using one of the interfaces, according to an alternative embodiment of the present invention.

FIG. 15A illustrates another wireline tool string 1500a that may be deployed using one of the interfaces 200, 1300, according to an alternative embodiment of the present invention. The pickup-unloader 1000c has been removed and replaced with another deflation tool, such as an electronic shut-in tool (ESIT) 1510. To facilitate placement of the ESIT, the plug 1000e has been replaced by a packer 1505. The ESIT 1510 may be connected to a lower portion of the inflatable packer 1505 and in fluid communication therewith. The packer may be identical to the plug 1000e except for replacement of the nose 1099 with a coupling for connection to the ESIT 1505. Additionally, the pickup unloader 1000c may be used in the string 1500a as a backup for the ESIT 1510.

The ESIT 1510 is illustrated in FIG. 8 of the '154 application. The ESIT 1510 may include an upper valve housing, a valve sleeve, a lower valve housing, a piston housing, a valve operator, a shear pin, a top sub, a head retainer, a thrust bearing, a boss, a nut connector, a drive housing, a motor crossover, a lower thrust bearing, a thrust sub, a grease plug, a motor housing, a motor bracket, a coupling, a coupling link, a shaft coupling, a battery crossover, a battery housing, a bottom sub, a battery pack, a drive shaft, an electric motor and electronics assembly, a nut, a filter, a connector, one or more O-rings, a wear strip, a longitudinal pressure seal, a cap screw, a set screw, a grease fitting, and a back up ring.

The electronics may include a memory and a controller having any suitable control circuitry, such as any combination of microprocessors, crystal oscillators and solid state logic circuits. The controller may include any suitable interface circuitry such as any combination of multiplexing circuits, signal conditioning circuits (filters, amplifier circuits, etc.), and analog to digital (ND) converter circuits. In use, the ESIT 1510 may be preprogrammed with the desired open and close intervals, for example, open for 30 minutes and close for 12 hours. When the ESIT 1510 is open, the packer 1505 will be allowed to deflate. When the ESIT 1510 is closed, the packer 1505 will be allowed to inflate, for example, by the inflation tool 1000a. The preprogrammed intervals will allow the tool string 1500a to be repositioned at another zone for testing.

The valve sleeve is longitudinally movable relative to the housings by operation of the motor. The valve sleeve is movable between a closed position where a wall of the valve sleeve covers one or more flow ports formed through a wall of the upper valve housing and an open position where the flow ports provide fluid communication between the packing element annulus 1089 and the wellbore. A shaft of the motor is rotationally coupled to the drive shaft via the couplings. A portion of the drive shaft has a thread formed on an outer surface thereof. The nut is engaged with the threaded portion of the drive shaft. Rotation of the drive shaft by the motor translates the nut longitudinally. The nut is longitudinally coupled to the valve operator. The valve operator has one or more slots formed through a wall thereof. A respective head retainer is disposed through each of the slots. Each head retainer is longitudinally coupled to the housing assembly. In the closed position, each head retainer engages an end of the slot. The valve operator is longitudinally coupled to the valve sleeve. Thus, rotation of the motor shaft moves the valve sleeve longitudinally relative to the housing assembly from the closed position to the open position where the valve sleeve openings are in fluid communication with a bore of the upper valve housing and thus the packer. In the open position, each head retainer engages the other end of the respective slot.

A bore formed through the valve sleeve is in fluid communication with the upper valve housing bore. The valve sleeve is also in filtered fluid communication with a bore formed through the piston housing. One or more ports are formed through a wall of the piston housing. The ports provide fluid communication between the piston housing bore and a bore formed through the valve operator. The slots formed through the valve operator provide fluid communication between the valve operator bore and a clearance defined between the valve operator and the top sub. The clearance provides fluid communication between the valve operator bore and a chamber formed between valve sleeve and the valve housing. This fluid path keeps a first longitudinal end of the valve sleeve equalized with a second end of the valve sleeve so that the motor does not have to overcome fluid force. Alternatively, the ESIT 1510 may be in communication with the FP Power Supply for receiving power and/or control signals.

FIG. 15B illustrates another wireline tool string 1500b that may be deployed using one of the interfaces 200, 1300, according to an alternative embodiment of the present invention. The tool string 1500b includes the packer 1505 and the plug 1000e separated by a spacer pipe 1515. Alternatively, the plug may be replaced by a second packer so that the ESIT 1510 may be used instead of the pickup unloader 1000d. In use, the packer and plug may be actuated to straddle a zone of interest. During testing, the zone(s) above the packer 1505 may be monitored for the production flow. The zone between the plug and the packer may be monitored for pressure changes caused by flowing the zone above the packer. The collected pressure data may be used to further determine the potential of the formation. Additionally, the zones may be monitored for temperature, fluid density, or other desired parameters.

FIG. 15C illustrates another wireline tool string 1500c that may be deployed using one of the interfaces 200, 1300, according to an alternative embodiment of the present invention. The tool string 1500c includes a production logging tester (PLT) 1520, two ESITs 1510a, b, and two instrumentation subs 1525a, b. The PLT 1520 includes a flow meter. The flow meter may be a simple single phase meter or a multiphase (i.e., gas, oil, and water) meter. The flow meter may be as simple as a spinner or as complex as a Venturi with a gamma ray tool and pressure and temperature sensors to measure flow rates of individual phases. The instrumentation subs 1525a, b may each include a pressure sensor and a temperature sensor in fluid communication with the wellbore. The instrumentation subs 1525a, b may also include sensors for measuring other wellbore parameters, such as fluid density, flow rate, and/or flow hold up. For the more complex flow meters, the instrumentation sub 1525a may be omitted if it is redundant. One of the instrumentation subs 1525a, b may also include sensors (discussed above) for monitoring tool string performance. The instrumentation sub 1525b is optional.

The tool string 1500c may straddle and test each of the zones individually. For example, the packers 1505a, b may be inflated adjacent one of the zones to straddle the zone. The ESIT 1505a port opens to allow production fluid into a bypass path in fluid communication with the PLT. The production fluid travels along the bypass path to the PLT 1520 which measures the flow rate of the fluid. The fluid exits the PLT 1520 and comingles with the fluid from any zones above the zone being tested. The data from the PLT 1520 may be stored in an internal memory unit or transmitted to the main controller for storage in the main controller memory or the memory unit/module. The packers may then be deflated using the second ESIT 1510b. The tool string 1500c may then be moved to the next zone of interest and the sequence repeated.

The tool string 1500c provides for collection of the flow test data in the wellbore 15 instead of at the surface. In this manner, any transient flow pattern (i.e., slugging) may be measured before the flow pattern changes while flowing to the surface.

Additionally, any of the tool strings 1000, 1500a-c may include a perforation gun. The perforation gun may be used after testing of the zones to further perforate any of the zones. Additionally, the strings may be moved to a depth of a new zone and the perforation gun used to create the new zone in the same trip that the zones are tested. Alternatively, the perforation gun may be used to create any one of the zones prior to testing.

While the foregoing is directed to embodiments of the present invention, other and further embodiments of the invention may be devised without departing from the basic scope thereof, and the scope thereof is determined by the claims that follow.

The invention claimed is:

1. A method of flow testing multiple zones in a wellbore, comprising acts of:
    lowering a tool string into the wellbore with a slickline, the tool string comprising a battery, a controller, an inflatable packer or plug, an electric pump, and a flow meter;
    operating the pump by the controller, thereby inflating the packer or plug and isolating a first zone from one or more other zones;
    monitoring flow from the first zone by measuring a flow rate using the flow meter;
    deflating the packer or plug;
    moving the tool string in the wellbore;
    operating the pump by the controller, thereby inflating the packer or plug and isolating a second zone from one or more other zones; and
    monitoring flow from the second zone by measuring a flow rate using the flow meter, wherein the zones are monitored in one trip.

2. The method of claim 1, wherein:
    the tool string further comprises a second packer or plug, and
    each zone is isolated by straddling using the packers or plugs.

3. The method of claim 1, further comprising:
    measuring a flow rate from a combination of the first zone, the second zone, and a third zone; and
    calculating a flow rate of the third zone based on measurements of the first and second zones and the combined flow rate.

4. The method of claim 1, further comprising perforating a production zone on the same trip.

5. The method of claim 1, wherein the pump comprises:
    a pressure balanced closed working fluid system having a working fluid pump and an electric motor operable to drive the working fluid pump, and
    a reciprocating hydraulic pump having a drive piston in selective fluid communication with the working fluid pump and a pump piston in selective fluid communication with the wellbore and the packer or plug.

6. A tool string for flow testing multiple zones in a wellbore, comprising:
    a slickline cable head;
    an inflatable packer or plug;
    an electric pump operable to inflate the packer or plug;
    a deflation tool operable to deflate the packer or plug in an open position, wherein:
        the deflation tool is repeatably operable between the open position and a closed position, and
        the tool string is tubular;
    a battery;

a flow meter;
a memory unit operable to store data from the flow meter; and
a controller operable to supply electricity from the battery to the pump.

7. The tool string of claim 6, further comprising a second inflatable packer or plug.

8. The tool string of claim 6, further comprising a perforation gun.

9. The tool string of claim 6, wherein the pump comprises:
a pressure balanced closed working fluid system having a working fluid pump and an electric motor operable to drive the working fluid pump, and
a reciprocating hydraulic pump having a drive piston for selective fluid communication with the working fluid pump and a pump piston for selective fluid communication with the wellbore and the packer or plug.

10. A method for setting a plug in a cased or lined wellbore, comprising acts of:
deploying a tool string in the wellbore using a slickline, the tool string comprising:
a battery;
a controller;
a setting tool coupled to the sickline, the setting tool having a first radial clearance between an outer surface of the setting tool and an inner surface of the wellbore casing;
an adapter kit comprising an adapter sleeve, the adapter kit having a second radial clearance between an outer surface of the adapter sleeve and an inner surface of the wellbore casing, the first radial clearance being substantially greater than the second radial clearance; and
a packer or plug comprising a packing element;
actuating the setting tool by the controller, wherein the setting tool exerts a force on the adapter sleeve which transfers the force to the packer or plug, thereby expanding the packing element into engagement with an inner surface of the casing or liner; and
separating the setting tool from the packer or plug, wherein the adapter sleeve remains with the packer or plug.

11. The method of claim 10, wherein:
the tool string further comprises one or more perforation guns, and
the method further comprises perforating the casing or liner at a first location, thereby forming one or more first perforations.

12. The method of claim 11, further comprising injecting formation treatment fluid into a formation via the first perforations.

13. The method of claim 12, further comprising removably and at least substantially sealing the first perforations.

14. The method of claim 13, wherein the first perforations are sealed using ball sealers.

15. The method of claim 13, further comprising perforating the casing or liner at a second location, thereby forming one or more second perforations.

16. The method of claim 15, wherein the first and second perforations are formed during the same trip.

17. The method of claim 15, further comprising injecting formation treatment fluid into the formation via the second perforations while the first perforations are sealed.

18. A tool string for use in a formation treatment operation, comprising:
a slickline cable head;
a setting tool comprising a mandrel, a setting sleeve, and a power charge operable to create high pressure gas for exerting a setting force on the setting sleeve,
wherein: the setting sleeve is longitudinally moveable relative to the setting tool mandrel between a first position and a second position, and
the setting tool has a maximum outer diameter;
an adapter kit, comprising an adapter rod and an adapter sleeve, wherein:
the adapter rod is longitudinally coupled to the setting tool mandrel and releasably coupled to a plug mandrel,
the adapter sleeve is configured so that when the setting sleeve is moved toward the second position the setting sleeve abuts the adapter sleeve, and
the adapter sleeve has a maximum outer diameter substantially greater than the setting tool maximum outer diameter;
a packer or plug comprising the plug mandrel and a packing element, wherein:
the packing element is disposed along an outer surface of the plug mandrel,
the adapter sleeve is configured to transfer the setting force to the plug, thereby radially expanding the packing element,
the adapter sleeve is coupled between the packer or plug and the setting sleeve such that release of the adapter rod from the plug mandrel leaves the adapter sleeve with the packer or plug, and
the tool string is tubular,
a battery; and
a controller operable to supply electricity from the battery to the power charge for ignition thereof.

19. The tool string of claim 18, further comprising one or more perforation guns.

* * * * *

UNITED STATES PATENT AND TRADEMARK OFFICE
CERTIFICATE OF CORRECTION

PATENT NO.        : 8,469,087 B2
APPLICATION NO.   : 13/019137
DATED             : June 25, 2013
INVENTOR(S)       : Gray Page 1 of 1

It is certified that error appears in the above-identified patent and that said Letters Patent is hereby corrected as shown below:

In the Claims:

Column 31, Claim 10, Line 25, please delete "sickline" and insert -- slickline -- therefor.

Signed and Sealed this
Twenty-fourth Day of September, 2013

Teresa Stanek Rea
*Deputy Director of the United States Patent and Trademark Office*